(12) United States Patent
Kim

(10) Patent No.: US 10,321,121 B2
(45) Date of Patent: Jun. 11, 2019

(54) STEREOSCOPIC IMAGES DISPLAY APPARATUS COMPRISING FLEXIBLE BARRIER PATTERN

(71) Applicant: RealD Spark, LLC, Beverly Hills, CA (US)

(72) Inventor: Seong Yong Kim, Suwon-si (KR)

(73) Assignee: RealD Spark, LLC, Beverly Hills, CA (US)

( * ) Notice: Subject to any disclaimer, the term of this patent is extended or adjusted under 35 U.S.C. 154(b) by 468 days.

(21) Appl. No.: 14/893,074

(22) PCT Filed: May 27, 2014

(86) PCT No.: PCT/KR2014/004734
§ 371 (c)(1),
(2) Date: Nov. 23, 2015

(87) PCT Pub. No.: WO2014/193150
PCT Pub. Date: Dec. 4, 2014

(65) Prior Publication Data
US 2016/0105664 A1   Apr. 14, 2016

(30) Foreign Application Priority Data

May 29, 2013  (KR) .................. 10-2013-0060816
Jun. 25, 2013  (KR) .................. 10-2013-0073257
(Continued)

(51) Int. Cl.
*G02F 1/1333* (2006.01)
*H04N 13/315* (2018.01)
(Continued)

(52) U.S. Cl.
CPC ....... *H04N 13/315* (2018.05); *G02B 27/2214* (2013.01); *G09G 3/3696* (2013.01);
(Continued)

(58) Field of Classification Search
CPC .................................................. G02B 27/2214
See application file for complete search history.

(56) References Cited

U.S. PATENT DOCUMENTS

| | | |
|---|---|---|
| 2011/0170026 A1 | 7/2011 | Lin |
| 2013/0057539 A1 | 3/2013 | Kim |
| 2014/0192172 A1* | 7/2014 | Kang ................. G02B 27/2214 348/55 |

FOREIGN PATENT DOCUMENTS

| | | |
|---|---|---|
| CN | 102981281 A | 3/2013 |
| GB | 2494214 A | 3/2013 |

(Continued)

OTHER PUBLICATIONS

International Search Report in International Application No. PCT/KR2014/004734, dated Aug. 14, 2014.
(Continued)

*Primary Examiner* — Phu Vu
(74) *Attorney, Agent, or Firm* — Penny L. Lowry; Neil G. Mothew

(57) ABSTRACT

The present specification provides a stereoscopic image display apparatus of which a barrier pattern arrangement can be modified according to the movement of a user. According to one example, disclosed is the stereoscopic image display apparatus comprising: an electrode on one side provided with a plurality of extended electrodes which are separated from each other; an electrode on the other side provided with a plurality of extended electrodes which are separated from each other; and a liquid crystal portion, arranged between the electrode on the one side and the electrode on the other side, for forming a barrier pattern according to an electric field or a potential difference selectively formed between the electrode on the one side and the electrode on the other side, wherein each of the extended electrodes of the electrode on the one side and each of the extended electrodes of the
(Continued)

electrode on the other side are provided so as to overlap while in mutually corresponding positions with respect to the liquid crystal portion at the center, and wherein the barrier pattern arrangement formed on the liquid crystal portion can be modified depending on the application state of a voltage or a pulse applied to the electrode on the one side and the electrode on the other side.

20 Claims, 31 Drawing Sheets

(30) Foreign Application Priority Data

Jul. 9, 2013 (KR) .......... 10-2013-0080587
Nov. 5, 2013 (KR) .......... 10-2013-0133716

(51) Int. Cl.
  *H04N 13/383* (2018.01)
  *G02B 27/22* (2018.01)
  *G09G 3/36* (2006.01)
  *H04N 13/366* (2018.01)

(52) U.S. Cl.
  CPC ......... *H04N 13/366* (2018.05); *H04N 13/383* (2018.05); *H04N 2213/001* (2013.01)

(56) References Cited

FOREIGN PATENT DOCUMENTS

| | | |
|---|---|---|
| JP | 2857429 B2 | 2/1999 |
| JP | 2007-058173 A | 3/2007 |
| JP | 2007-164116 A | 6/2007 |
| JP | 2007-171908 A | 7/2007 |
| JP | 2007-293270 A | 11/2007 |
| JP | 2011-013575 A | 1/2011 |
| JP | 2012-032611 A | 2/2012 |
| JP | 2014-500970 A | 1/2014 |
| JP | 2014-509465 A | 4/2014 |
| KR | 10-2012-0034581 A | 4/2012 |
| KR | 10-2012-0119982 A | 11/2012 |
| WO | 2012/137879 A1 | 10/2012 |

OTHER PUBLICATIONS

International Search Report and Written Opinion of the International Searching Authority dated Aug. 14, 2014 for Application No. PCT/KR2014/004734.

European Search Report dated Nov. 16, 2016 for Application No. 14803336.8.

\* cited by examiner (a)

| Control Signal Table | | | | |
|---|---|---|---|---|
| Terminal | STEP 1 | STEP 2 | STEP 3 | STEP 4 |
| C1 | H(L) | H(L) | H(L) | L(H) |
| C2 | L(H) | H(L) | H(L) | H(L) |
| C3 | H(L) | L(H) | H(L) | H(L) |
| C4 | H(L) | H(L) | L(H) | H(L) |

| Active Parallax Barrier Control Signals (LANDSCAPE MODE) | | | | |
|---|---|---|---|---|
| Terminal | STEP 1 | STEP 2 | STEP 3 | STEP 4 |
| C1 | H(L) | H(L) | H(L) | H(L) |
| C2 | L(H) | H(L) | H(L) | L(H) |
| C3 | L(H) | L(H) | H(L) | H(L) |
| C4 | L(H) | H(L) | L(H) | H(L) |
| C1' | OFF | OFF | OFF | OFF |
| C2' | OFF | OFF | OFF | OFF |
| C3' | OFF | OFF | OFF | OFF |
| C4' | OFF | OFF | OFF | OFF |

STEREOSCOPIC IMAGES DISPLAY APPARATUS COMPRISING FLEXIBLE BARRIER PATTERN

CROSS-REFERENCE TO RELATED APPLICATIONS

This application is the National Stage filing under 35 U.S.C. 371 of International Application No. PCT/KR2014/004734, filed on May 27, 2014, which claims the benefits of Korean Patent Application No. 10-2013-0060816, filed on May 29, 2013, Korean Patent Application No. 10-2013-0073257, filed on Jun. 25, 2013, Korean Patent Application No. 10-2013-0080587, filed on Jul. 9, 2013 and Korean Patent Application No. 10-2013-0133716, filed on Nov. 5, 2013, the contents of which are all hereby incorporated by reference herein in their entirety.

TECHNICAL FIELD

The present invention relates to a stereoscopic image display apparatus and a control method thereof, and more particularly, to a stereoscopic image display apparatus that is capable of satisfactorily providing a stereoscopic image irrespective of a user's movement and a control method thereof.

BACKGROUND ART

In general, a stereoscopic image, which is expressed in three dimensions, is formed according to a stereoscopic principle based on two eyes. A depth effect is obtained through binocular parallax caused by a distance of about 65 mm between the two eyes.

Consequently, the left and right eyes view different two-dimensional images, which are transmitted to the brain via the retina. The brain combines the two images to reproduce the depth and realism of the original three-dimensional image. This is generally called stereography.

Based on whether glasses are worn, a stereoscopic image display apparatus is generally classified as a stereoscopic type stereoscopic image display apparatus or an autostereoscopic type stereoscopic image display apparatus. The autostereoscopic type stereoscopic image display apparatus is generally classified as a lenticular type stereoscopic image display apparatus or a parallax-barrier type stereoscopic image display apparatus.

A conventional parallax-barrier type stereoscopic image display apparatus will be described with reference to FIGS. 1 and 2.

The conventional parallax-barrier type stereoscopic image display apparatus includes a display module 10, on which left images L and right images R corresponding to a left eye and a right eye, respectively, are alternately arranged in a horizontal direction (an X-X' direction in FIG. 2), the left images L and the right images R extending in a vertical direction (a Y-Y' direction in FIG. 2), and barriers 20, which are bar type blocking films, disposed in front of the display module 10, the barriers 20 extending in the vertical direction.

In the above-described stereoscopic image display apparatus, the display module 10 and the barriers 20 are arranged such that light corresponding to the left images L is incident upon the left eye, and light corresponding to the right images R is incident upon the right eye. As a result, the two divided left and right images L and R are separately viewed, whereby a depth effect is realized.

In the conventional parallax-barrier type stereoscopic image display apparatus, which uses a liquid crystal module, the vertical type barriers are arranged parallel to each other in the horizontal direction, and a segment terminal S and a common terminal C are connected to all pixels in order to control all of the pixels to be simultaneously turned ON or OFF. For this reason, a direction in which the barriers are arranged is fixed, with the result that it is possible to view a stereoscopic image only through a screen that displays an image in a fixed direction.

That is, the conventional art has a problem in that, when the position of the eyes of a user is changed as the user moves his/her head or body, the left images may be perceived by the right eye, and the right image may be perceived by the left eye, whereby a reverse-phase stereoscopic image is formed.

DISCLOSURE

Technical Problem

The present invention has been made in view of the above problems, and it is an object of the present invention to provide a stereoscopic image display apparatus that is capable of satisfactorily providing a stereoscopic image irrespective of user's movement and a control method thereof.

Technical Solution

In accordance with an aspect of the present invention, the above and other objects can be accomplished by the provision of a stereoscopic image display apparatus including a one-side electrode including a plurality of extension electrodes spaced apart from each other, an opposite-side electrode including a plurality of extension electrodes spaced apart from each other, and a liquid crystal unit interposed between the one-side electrode and the opposite-side electrode for forming barrier patterns based on an electric field or a potential difference selectively formed therebetween, wherein one of the extension electrodes of the one-side electrode overlaps at least two of the extension electrodes of the opposite-side electrode, and a state in which the barrier patterns formed in the liquid crystal unit are arranged is changed based on voltages or pulses applied to the one-side electrode and the opposite-side electrode.

Advantageous Effects

According to the present invention, it is possible to continuously and stably provide a stereoscopic image even when the position of the eyes of a user is changed due a user's movement.

That is, a state of arrangement of patterns of the parallax barrier is not fixed, and the patterns of the parallax barrier are changeable in response to the change in position of the eyes of a viewer or a user.

Consequently, left images are continuously perceived by the left eye, and right image are continuously perceived by the right eye, whereby it is possible to prevent the formation of a reverse-phase stereoscopic image due to the change in position of the eyes of the user and to prevent crosstalk, a phenomenon in which the left and right images overlap each other, from being perceived by the eyes.

DESCRIPTION OF DRAWINGS

Figure 26:
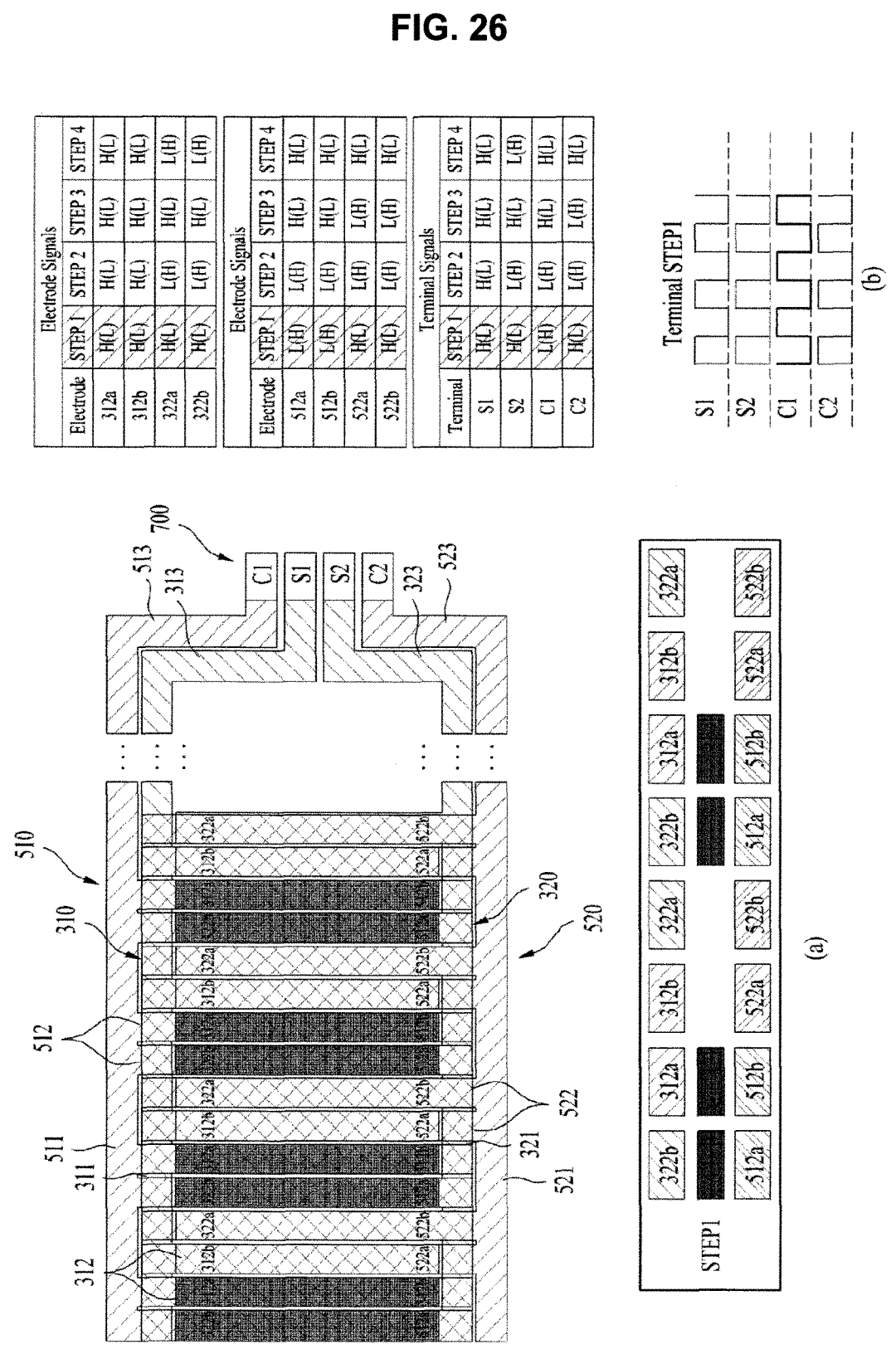

FIGS. 22 to 29 are views illustrating a fourth embodiment of the present invention.

BEST MODE

Hereinafter, the preferred embodiments of the present invention will be described with reference to the accompanying drawings.

Figure 1:
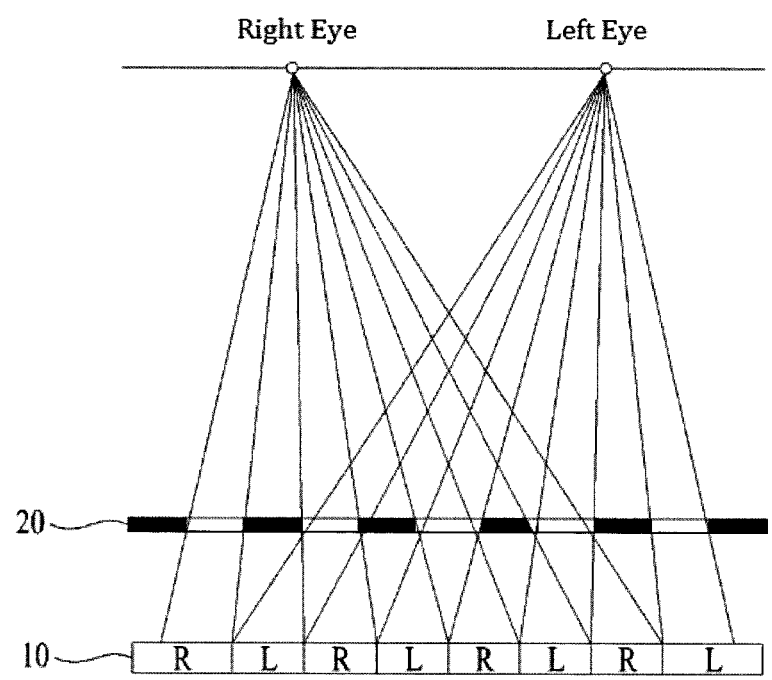
FIGS. 1 and 2 are views illustrating the operation of a conventional parallax-barrier type stereoscopic image display apparatus.
Figure 2:
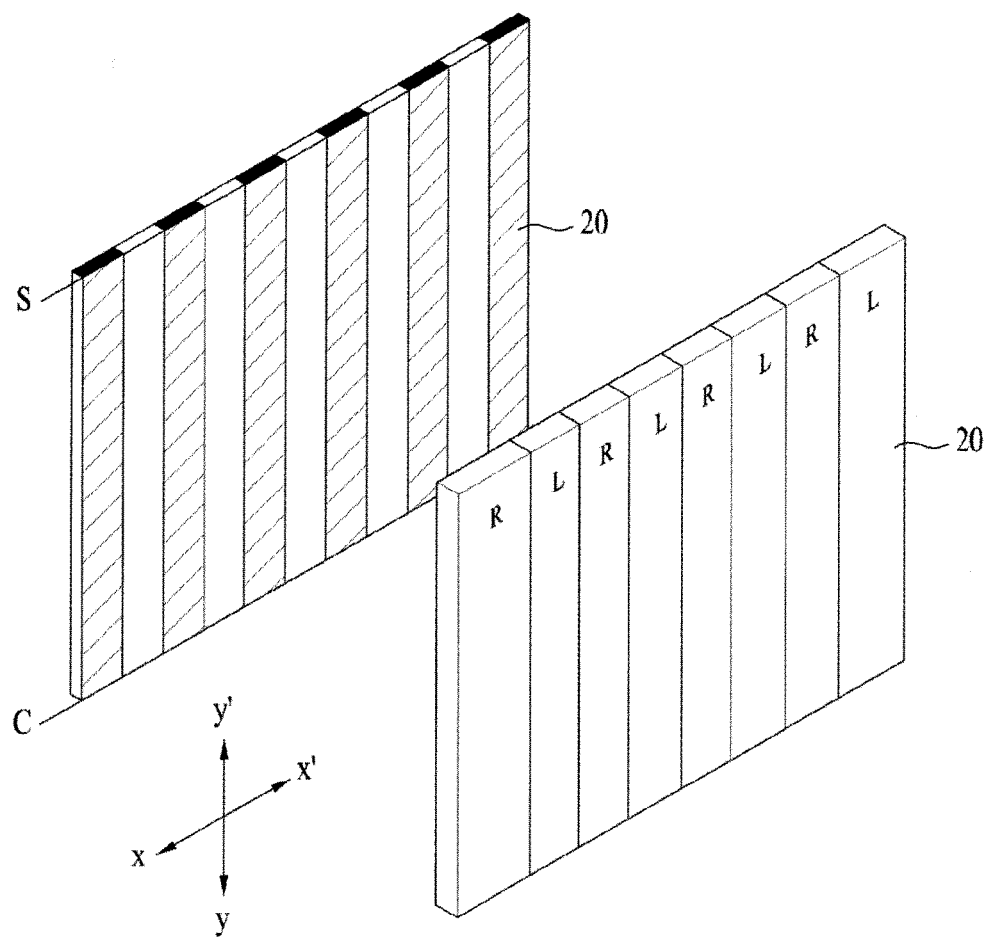
Figure 3:
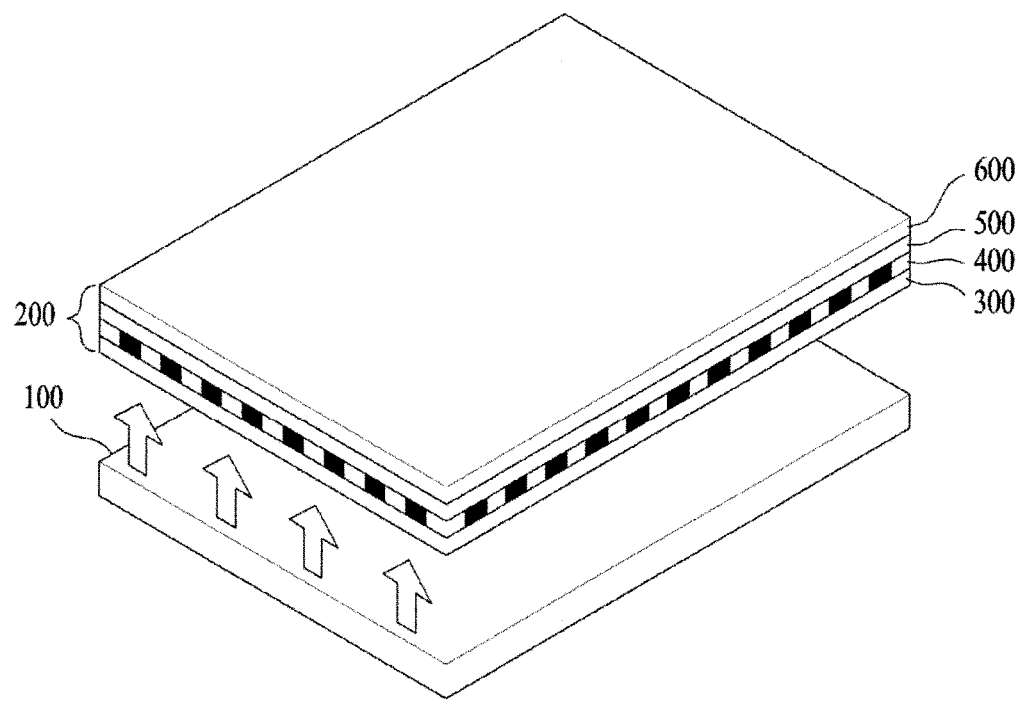
FIG. 3 is a view schematically showing a parallax barrier according to the present invention and the constructional elements of a stereoscopic image display apparatus including the parallax barrier.

FIG. 3 is a view schematically showing a parallax barrier according to the present invention and the constructional elements of a stereoscopic image display apparatus including the parallax barrier.

A parallax barrier 200 according to the present invention may include a one-side electrode 300, a liquid crystal unit 400, an opposite-side electrode 500, and a polarizing film 600. The one-side electrode 300 may function as an upper electrode or a front electrode, in which case, the opposite-side electrode 500 may function as a lower electrode or a rear electrode, and vice versa.

The liquid crystal unit 400 has a liquid crystal layer provided therein. Barrier patterns may be formed in the liquid crystal unit 400 based on a potential difference or an electric field generated between the one-side electrode 300 and the opposite-side electrode 500. In addition, the parallax barrier 200 and the stereoscopic image display apparatus including the parallax barrier 200 may form barrier patterns using a liquid crystal panel, such as a TN-LCD or an STN-LCD, such that the barrier is turned off to view a 2D image in a 2D mode, and the barrier is turned on to view a 3D image in a 3D mode.

Hereinafter, a description will be given of various embodiments in which a state of arrangement of patterns of the parallax barrier is not fixed, and the patterns of the parallax barrier are changeable in response to the change in position of the eyes of a viewer or a user, as described above.

First Embodiment

Figure 4:
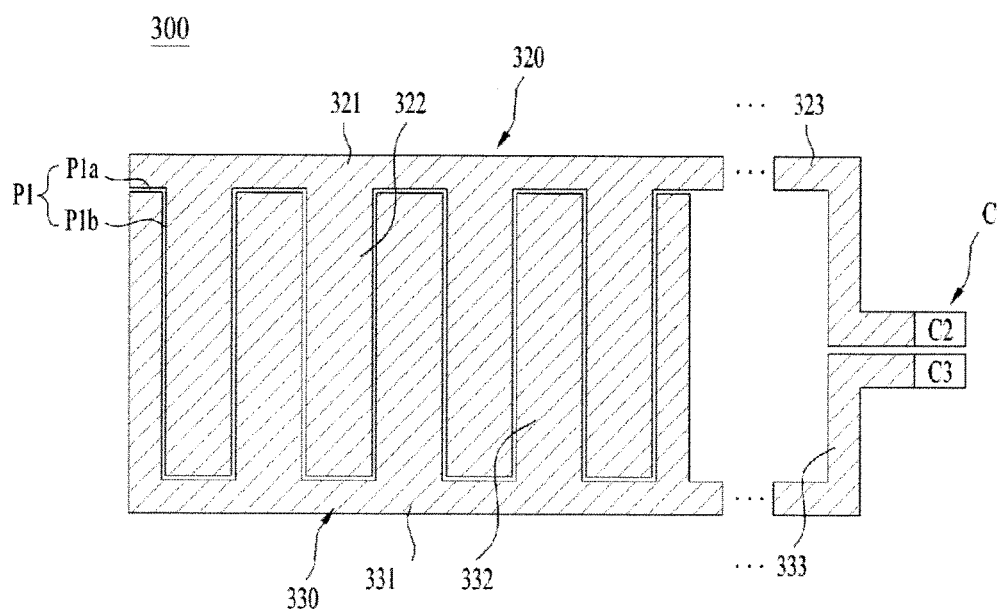
FIGS. 4 to 10 are views illustrating a first embodiment of the present invention.
Figure 5:
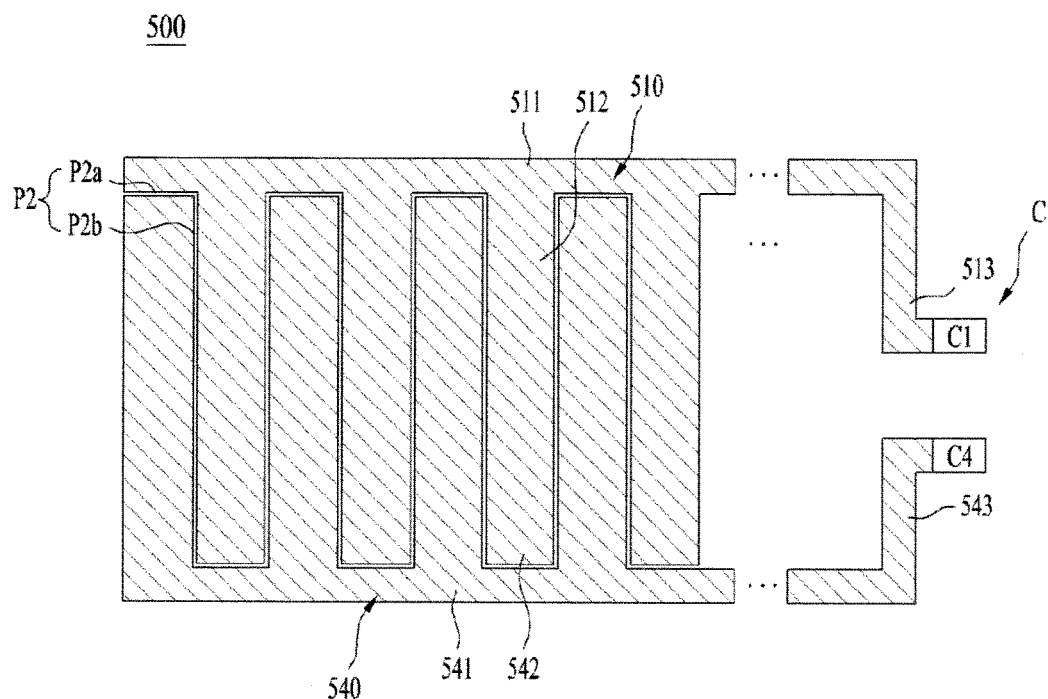

FIGS. 4 and 5 are views illustrating the construction of a one-side electrode and an opposite-side electrode according to an embodiment of the present invention.

As shown in FIG. 4, a one-side electrode 300 may include a second electrode 320 and a third electrode 330, which are separated from each other. The second electrode 320 and the third electrode 330 may be separated from each other by a first pattern P1 for separating the second electrode 320 and the third electrode 330 from each other to prevent electrical conduction between the second electrode 320 and the third electrode 330. In addition, the one-side electrode 300 may be configured as a transparent electrode in order to satisfactorily transmit light. The first pattern P1 may be formed to have a predetermined thickness. The first pattern P1 may include horizontal pattern parts P1a, which are formed horizontally, and vertical pattern parts P2b, which are formed vertically. The horizontal pattern parts P1a and the vertical pattern parts P1b may be alternatively connected to each other.

A terminal unit C for applying voltage to the one-side electrode 300 and the opposite-side electrode 500 may be provided beside the one-side electrode 300. The terminal unit C may include two terminals.

The terminal unit C may include a second terminal C2 and a third terminal C3. The second terminal C2 may be electrically conductively connected to the second electrode 320, and the third terminal C3 may be electrically conductively connected to the third electrode 330.

The second electrode 320 may include a second guide electrode 321, which is provided horizontally, a plurality of second extension electrodes 322, which extends perpendicularly from the second guide electrode 321, and a second connection electrode 323 for connecting the second guide electrode 321 to the second terminal C2. As shown in FIG. 4, the second extension electrodes 322 may be spaced apart from each other.

In a similar manner to the second electrode 320, the third electrode 330 may include a third guide electrode 331, which extends horizontally, a plurality of third extension electrodes 332, which extends perpendicularly from the third guide electrode 331, and a third connection electrode 333 for connecting the third guide electrode 331 to the third terminal C3. The third extension electrodes 332 may be spaced apart from each other.

As shown in FIG. 4, the second extension electrodes 322 and the third extension electrodes 322 may be alternately arranged. That is, the second extension electrodes 322 and the third extension electrodes 322 may neighbor each other. In addition, ends of the second extension electrodes 322 may be adjacent to the third guide electrode 331, and the ends of the third extension electrodes 332 may be adjacent to the second guide electrode 321. The second extension electrodes 322 and the third extension electrodes 332 may be spaced apart from each other by the first pattern P1.

As a result, the second electrode 320 and the third electrode 330 may be engaged with each other.

As shown in FIG. 5, an opposite-side electrode 500 may also include a first electrode 510 and a fourth electrode 540, which are separated from each other. The first electrode 510 and the fourth electrode 540 may be separated from each other by a second pattern P2 for separating the first electrode 510 and the fourth electrode 540 from each other to prevent electrical conduction between the first electrode 510 and the fourth electrode 540. The second pattern P2 may be formed to have a predetermined thickness. The second pattern P2 may include horizontal pattern parts P2a, which are formed horizontally, and vertical pattern parts P2b, which are formed vertically. The horizontal pattern parts P2a and the vertical pattern parts P2b may be alternatively connected to each other.

The first electrode 510 may include a first guide electrode 511, which is provided horizontally, and a plurality of first extension electrodes 512, which extends perpendicularly from the first guide electrode 511.

A first connection electrode 513 may be electrically conductively connected to a first terminal C1, and a second connection electrode 543 may be electrically conductively connected to a fourth terminal C4. The remainder of the construction of the opposite-side electrode 500 is identical to that of the one-side electrode 300.

Figure 6:
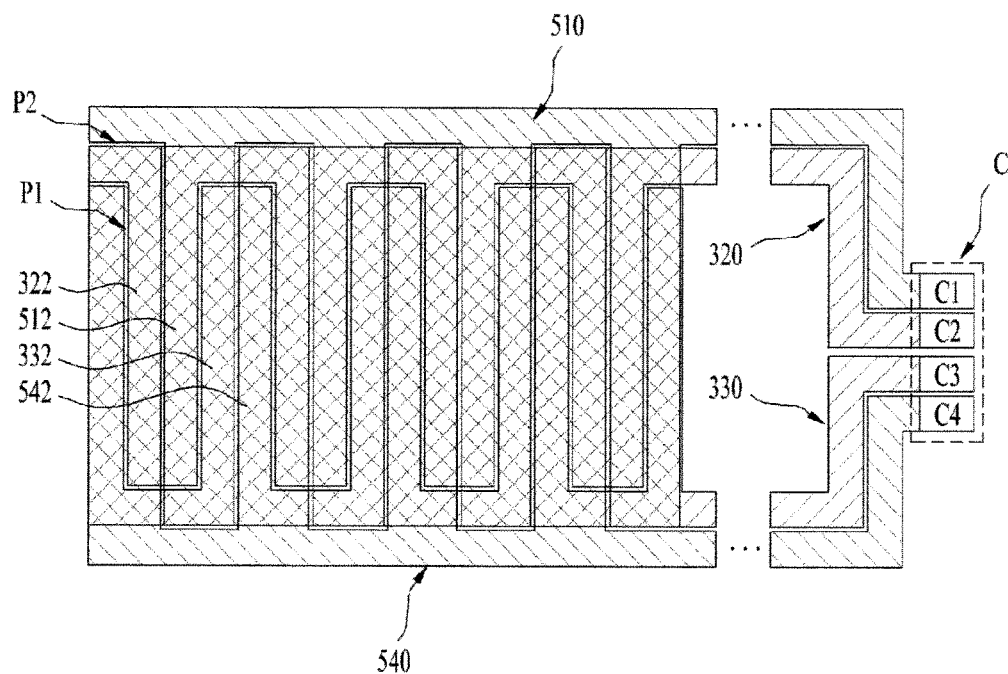
Figure 7:
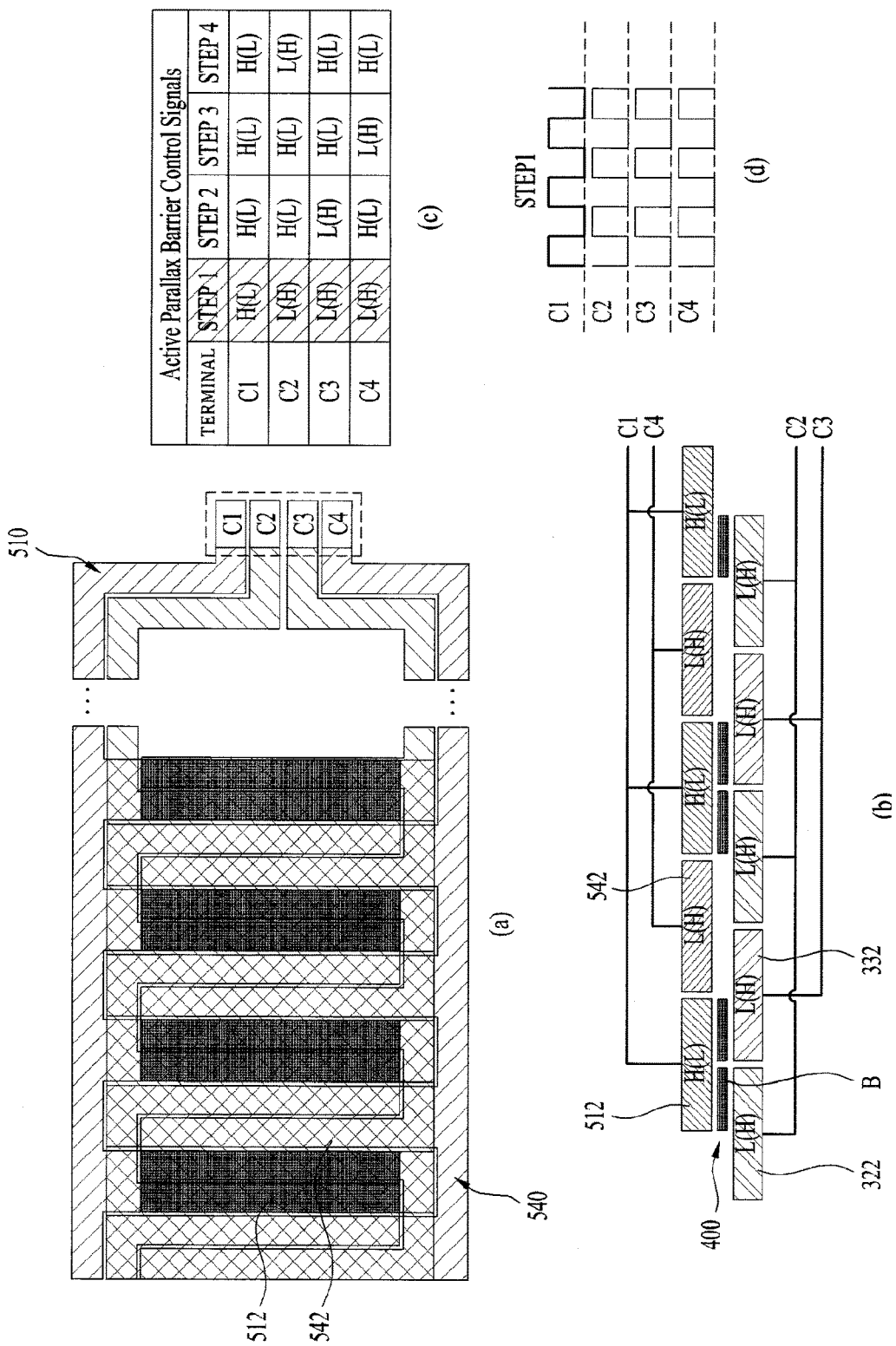

FIG. 6 is a view illustrating an example in which the one-side electrode and the opposite-side electrode are stacked according to an embodiment of the present invention.

In a case in which the one-side electrode 300 and the opposite-side electrode 500 are stacked in a state in which a liquid crystal unit is interposed between the one-side electrode 300 and the opposite-side electrode 500, as shown in FIG. 6, the one-side electrode 300 and the opposite-side electrode 500 are spaced apart from each other excluding partial intersections between the first pattern P1 and the second pattern P2.

Furthermore, the first pattern P1 and the second pattern P2 are alternately arranged in a vertical direction. As a result, a plurality of regions is surrounded by the first pattern P1 and the second pattern P2.

Barrier patterns are selectively formed or not formed in these regions based on the potential difference caused by voltages or pulses independently applied from the first to fourth terminals C1 to C4 to the first to fourth electrodes 320, 330, 510, and 540.

The second extension electrodes 322 and the third extension electrodes 332 of the one-side electrode 300 may partially overlap the first extension electrodes 512 of the opposite-side electrode 500. In addition, the second extension electrodes 322 and the third extension electrodes 332 of the one-side electrode 300 may also partially overlap fourth extension electrodes 542 of the opposite-side electrode 500.

Meanwhile, the first guide electrode 510 and a fourth guide electrode 541 may be disposed further outward than the second guide electrode 321 and the third guide electrode 331, and the first connection electrode 513 and the fourth connection electrode 543 may be disposed further outward than the second connection electrode 323 and the third connection electrode 333. As a result, the connection electrodes and the guide electrodes are formed in the same plane, thereby reducing the cost required to configure an additional stacked structure. The outward arrangement as described above is fixed. That is, an inward arrangement may be provided instead of the outward arrangement.

A state of arrangement of the barrier patterns may be changed based on partial overlap of the extension electrodes and the change in voltages or pulses applied thereto.

The barrier patterns are changed in order to reflect the change in position of user's gaze viewing the stereoscopic image display apparatus according to the present invention such that a reverse-phase stereoscopic image is not formed, irrespective of any change in position of user's gaze.

The change in arrangement of the barrier patterns caused by selectively applying voltage according to the change in position of user's gaze in the first embodiment will be described with reference to FIGS. 7 to 10.

FIG. 7(a) is a view showing a state in which barrier patterns appear during a first step operation of the parallax barrier. The barrier patterns appear along the first extension electrodes 512 of the first electrode 510, but do not appear along the fourth extension electrodes 542.

Since the first extension electrodes 511 and the fourth extension electrodes 542 are alternately arranged, the barrier patterns at the first step are spaced apart from each other based on a state of arrangement of the first extension electrodes 512.

FIG. 7(b) is a plan sectional view showing a portion of the liquid crystal unit 400 in which the barrier patterns appear, and a portion of the liquid crystal unit 400 in which the barrier patterns do not appear, as a result of the liquid crystal layer being formed in the liquid crystal unit 400 based on whether voltages or pulses is applied to the first to fourth electrodes, specifically the first to fourth extension electrodes 322, 332, 512, and 542, in a case in which the barrier patterns appear as shown in FIG. 7(a).

Meanwhile, FIGS. 7(c) and 7(d) are tables showing states in which voltages or pulses is applied to respective terminals in states at the respective steps showing the change in arrangement of the barrier patterns. The first step is shown emphasized.

Meanwhile, in tables shown in FIGS. 7(c) to 10(c), H indicates a state after high potential voltage is applied, and L indicates a state after low potential voltage is applied. In the following description, "H" means a state in which higher potential voltage is applied than in the "L" state.

As shown in FIG. 7(b), high potential voltage may be applied only to the first terminal C1, which is electrically conducted to the first electrode 510, and low potential voltage may remain applied to the second to fourth electrodes 320, 330, and 540, in order to form the barrier patterns only along the first extension electrodes 512, as shown in FIG. 7(a). Alternatively, low potential voltage may be applied only to the first terminal C1, and high potential voltage may continue to be applied to the second to fourth electrodes 320, 330, and 540. (See a state of the first step shown in FIG. 7(c)).

In a state in which voltage is applied as described above, a potential difference or an electric field is generated between the first extension electrodes 512 and the second extension electrodes 322, and a potential difference or an electric field is generated between the first extension electrodes 512 and the third extension electrodes 332, whereby barrier patterns are formed in the liquid crystal unit 400.

Meanwhile, the same potential voltage is applied to the fourth extension electrodes 542, the second extension electrodes 322, and the third extension electrodes 332. As a result, no potential difference or electric field is generated between the fourth extension electrodes 542 and the second extension electrodes 322 and between the fourth extension electrodes 542 and the third extension electrodes 332, whereby no barrier patterns are formed in the liquid crystal unit 400 located therebetween.

Figure 8:
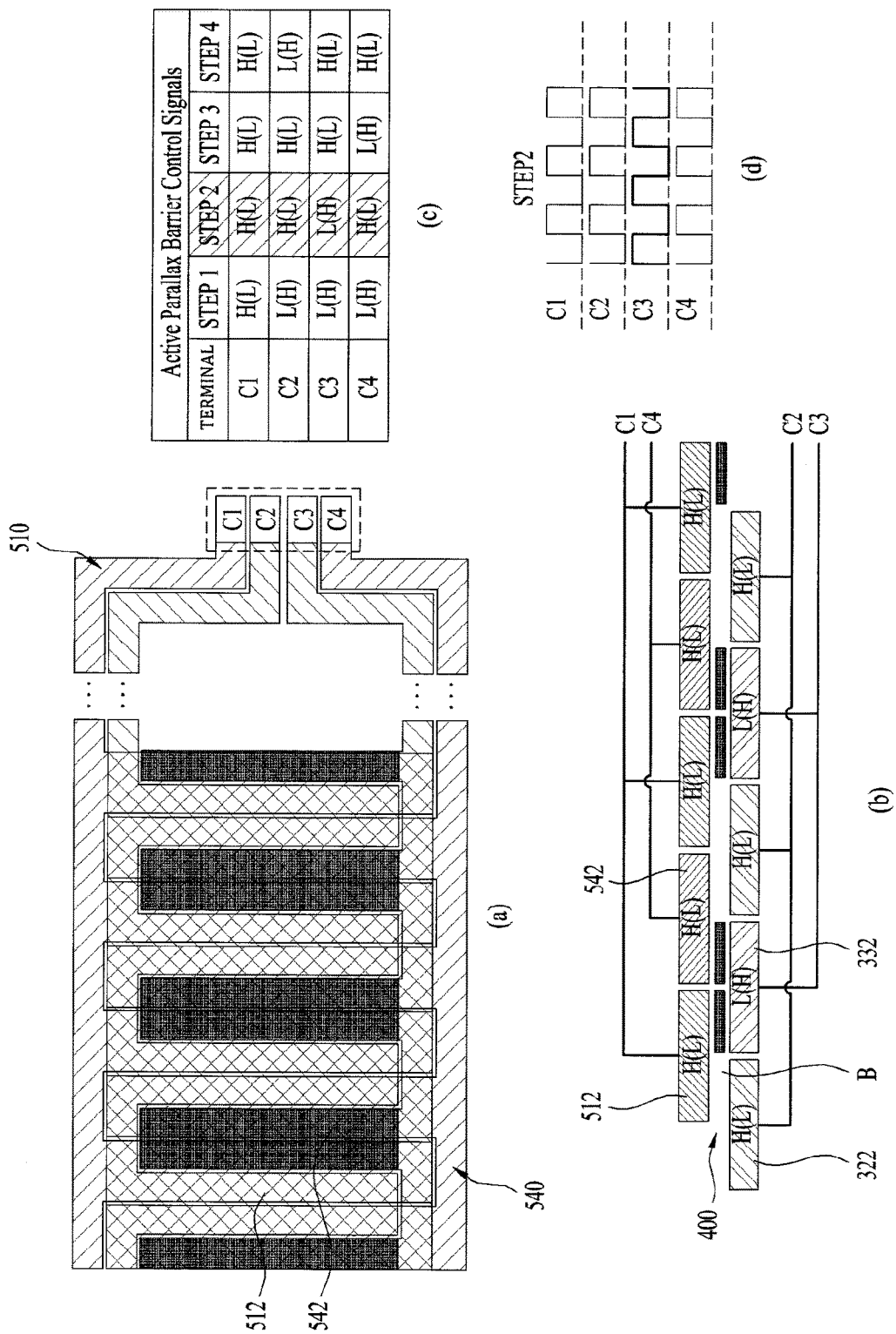
Figure 9:
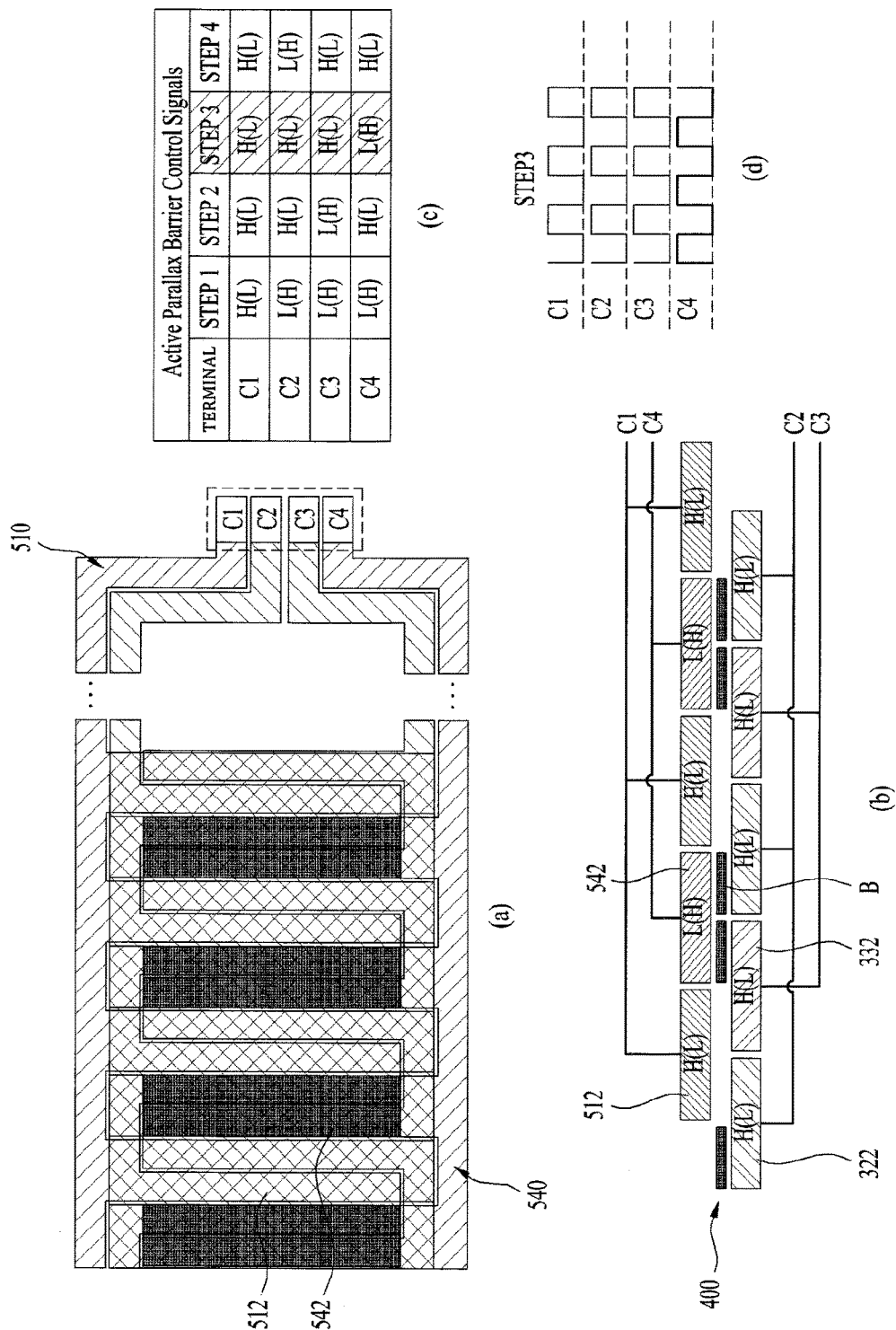
Figure 10:
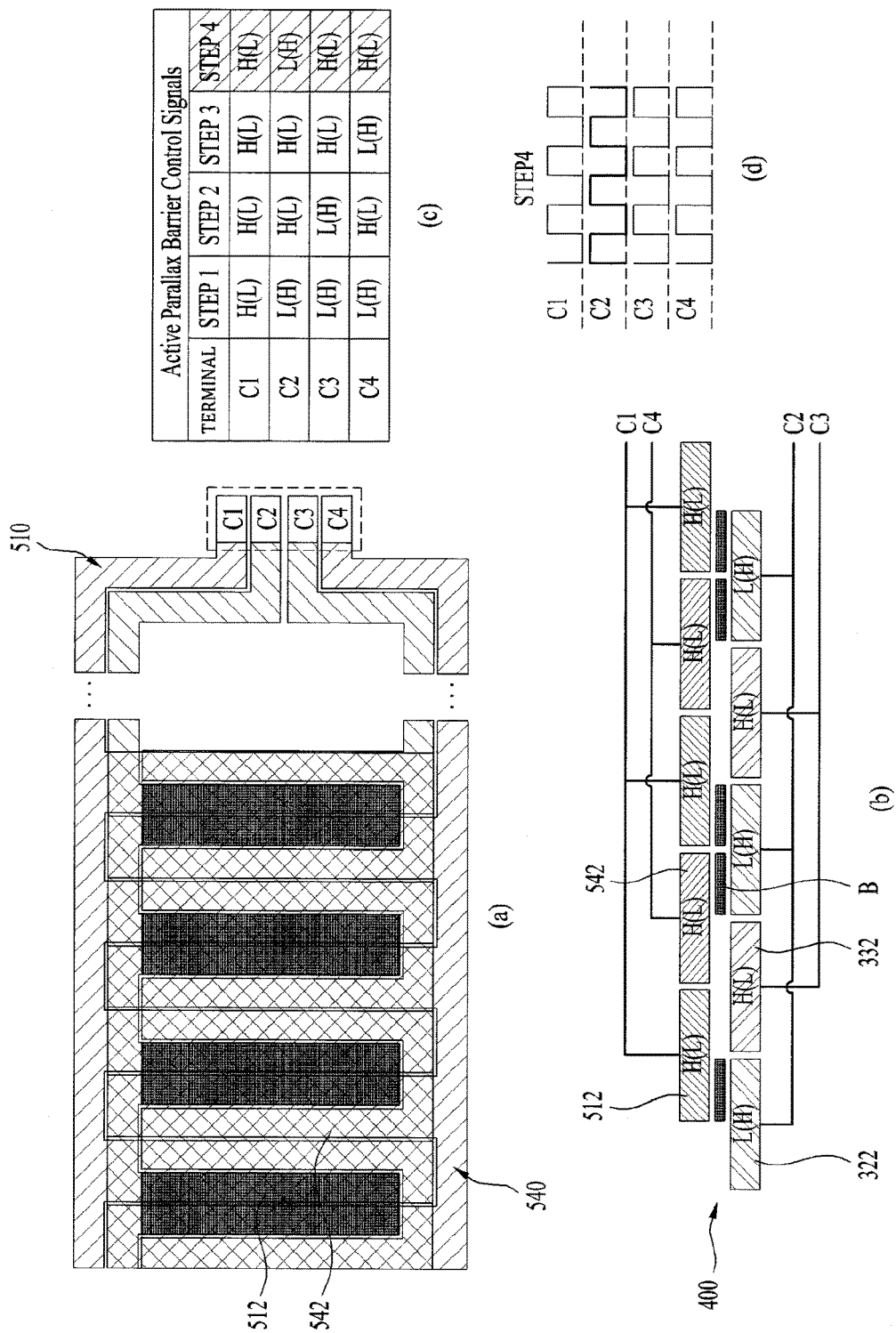

When second to fourth step operations are performed after the first step operation of the parallax barrier, the barrier patterns may be sequentially shifted in a specific direction by one column according to principles shown in FIGS. 8 to 10. The change in state to the second to fourth step may be achieved based on the change in position of the barrier patterns, performed according to the same principle as was described above.

Second Embodiment

Figure 11:
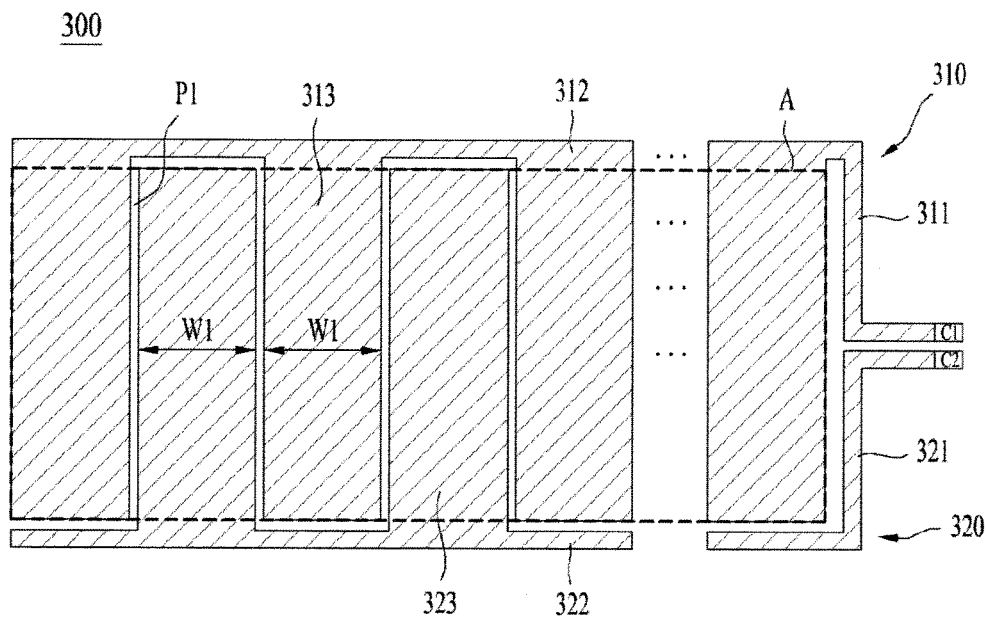
FIGS. 11 to 15 are views illustrating a second embodiment of the present invention.
Figure 12:
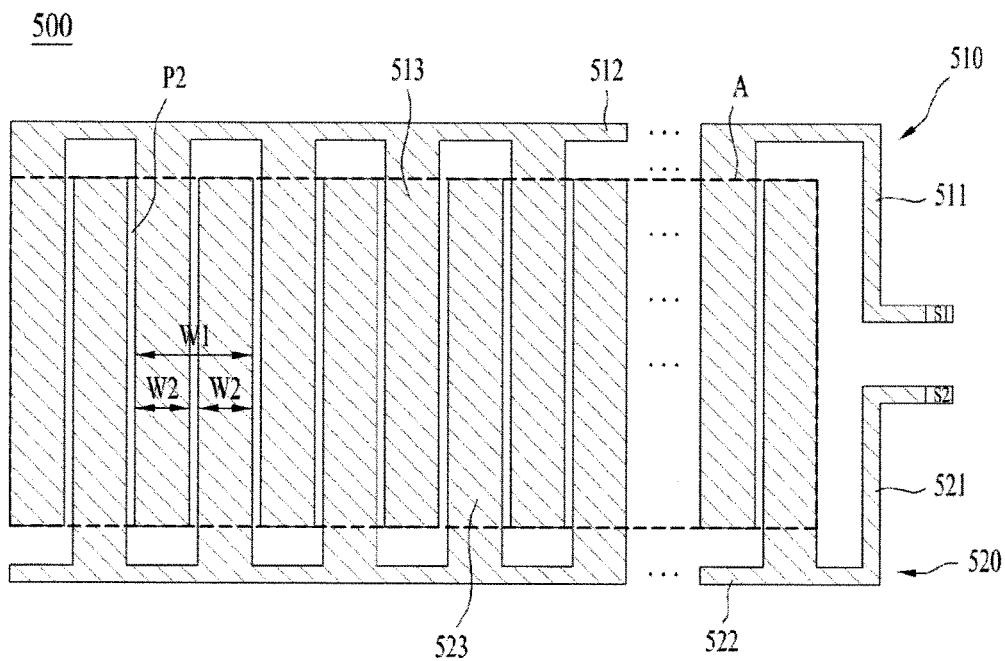

FIGS. 11 and 12 are views illustrating the construction of a one-side electrode and an opposite-side electrode according to another embodiment of the present invention.

As shown in FIG. 11, a one-side electrode 300 may include a first one-side electrode 310 and a second one-side electrode 320, which are separated from each other. The first one-side electrode 310 and the second one-side electrode 320 may be spaced apart and separated from each other by a predetermined pattern P1. In addition, a first one-side electrode terminal C1 and a second one-side electrode terminal C2 for applying voltage to the first one-side electrode 310 and the second one-side electrode 320, respectively, may be provided beside the one-side electrode 300.

In addition, the first one-side electrode 310 may include a first one-side connection electrode 311, which is connected to the first one-side electrode terminal C1, a first one-side guide electrode 312, which is connected to the first one-side connection electrode 311, and first one-side extension electrodes 313, which extend from the first one-side guide electrode 312 in a specific direction (downward in this figure). In addition, the second one-side electrode 320 may include a second one-side connection electrode 321, which is connected to the second one-side electrode terminal C2, a second one-side guide electrode 322, which is connected to the second one-side connection electrode 321, and second one-side extension electrodes 323, which extend from the second one-side guide electrode 322 in a specific direction (upward in this figure).

The first one-side extension electrodes 313 and the second one-side extension electrodes 323 may neighbor each other. In addition, the first one-side extension electrodes 313 and the second one-side extension electrodes 323 may be alternately arranged in a width direction of the parallax barrier 200.

As a result, the first one-side electrode 310 and the second one-side electrode 320 may be engaged with each other.

In this figure, a dotted-line box indicates an effective activation region A, in which barrier patterns are actually formed or not formed, whereby a state of arrangement of the barrier patterns is changed.

Ends of the first one-side extension electrodes 313 and ends of the second one-side extension electrodes 323 may correspond to a boundary of the effective activation region A.

Meanwhile, as shown in FIG. 12, an opposite-side electrode 500 may include a first opposite-side electrode 510 and a second opposite-side electrode 520, which are separated from each other. The first opposite-side electrode 510 and a second opposite-side electrode 520 may be spaced apart and separated from each other by a predetermined pattern P2. A first opposite-side electrode terminal S1 and a second opposite-side electrode terminal S2 for applying voltage to the first opposite-side electrode 510 and a second opposite-side electrode 520, respectively, may be provided beside the opposite-side electrode 300.

The first opposite-side electrode 510 may include a first opposite-side connection electrode 511, which is connected to the first opposite-side electrode terminal S1, a first opposite-side guide electrode 512, which is connected to the first opposite-side connection electrode 511, and first opposite-side extension electrodes 513, which extend from the first opposite-side guide electrode 512 in a specific direction (downward in this figure). In addition, the second opposite-side electrode 520 may include a second opposite-side connection electrode 521, which is connected to the second opposite-side electrode terminal S2, a second opposite-side guide electrode 522, which is connected to the second opposite-side connection electrode 521, and second opposite-side extension electrodes 523, which extend from the second opposite-side guide electrode 522 in a specific direction (upward in this figure).

The first opposite-side extension electrodes 513 and the second opposite-side extension electrodes 523 may neighbor each other. In addition, the first opposite-side extension electrodes 513 and the second opposite-side extension electrodes 523 may be alternately arranged in the width direction of the parallax barrier 200.

Each of the first one-side extension electrodes 313 and each of the second one-side extension electrodes 323 may have the same width W1, and each of the first opposite-side extension electrodes 513 and each of the second opposite-side extension electrodes 523 may have the same width W2, which is less than the width W1.

The widths of the electrodes are set as described above such that a plurality of opposite-side extension electrodes 513 and 523 overlap one of the one-side extension electrodes 313 or 323. Based on the overlapping structure, a state of arrangement of the barrier patterns may be changed, and the barrier patterns may be shifted correspondingly.

One of the first opposite-side extension electrodes 313 and one of the second opposite-side extension electrodes 323 form a set (pair), and this set (pair) may overlap one of the first one-side extension electrodes 313 or one of the second one-side extension electrodes 323.

As a result, the first one-side electrode 310 and the second one-side electrode 320 may be engaged with each other.

In this figure, a dotted-line box indicates an effective activation region A.

Figure 13:
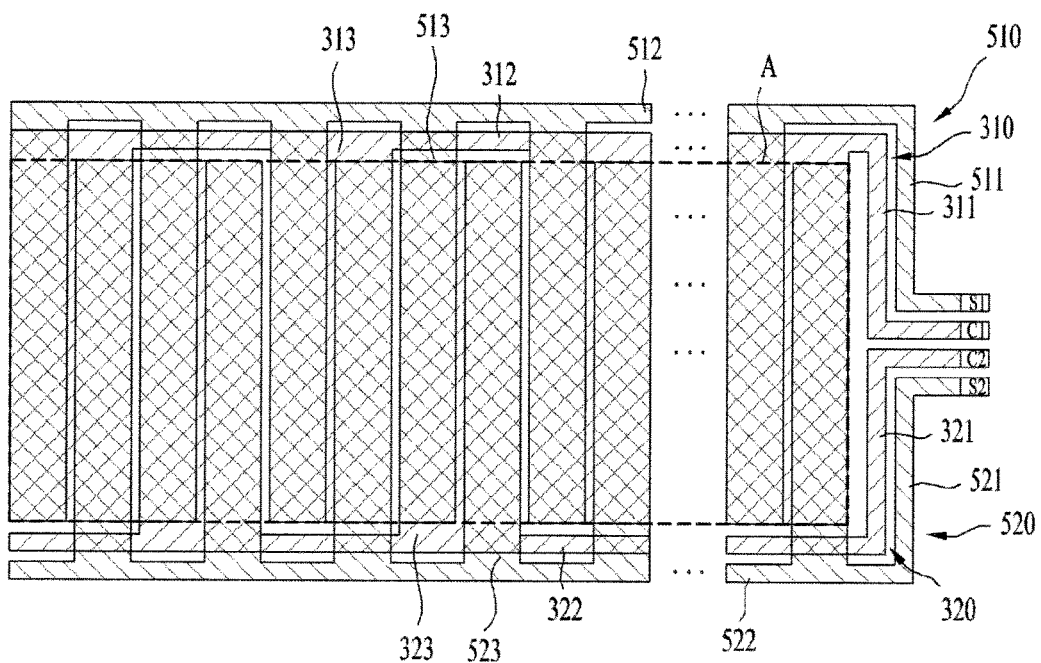

FIG. 13 is a view showing a state in which the one-side electrode and the opposite-side electrode overlap each other.

A plurality of (in FIG. 13, two) opposite-side extension electrodes 513 and 523 overlap one of the one-side extension electrodes 313 or 323. This structure may be identical to a structure configured such that one of the opposite-side extension electrodes, which has the same width as one of the one-side extension electrodes, is divided into a plurality of parts, which overlaps one of the one-side extension electrodes.

In the overlapping structure as described above, the first and second opposite-side connection electrodes 511 and 521 may be disposed outside the first and second one-side connection electrodes 311 and 321. In addition, the first and second opposite-side guide electrodes 512 and 522 may be disposed outside the first and second one-side guide electrodes 312 and 322.

Meanwhile, the width of a set constituted by the first and second opposite-side extension electrodes 513 and 523 may be equivalent to that of each of the first and second one-side extension electrodes 313 and 323.

In this way, a state of arrangement of the barrier patterns may be changed based on overlap of the extension electrodes and the change in voltages or pulses applied thereto.

Figure 14:
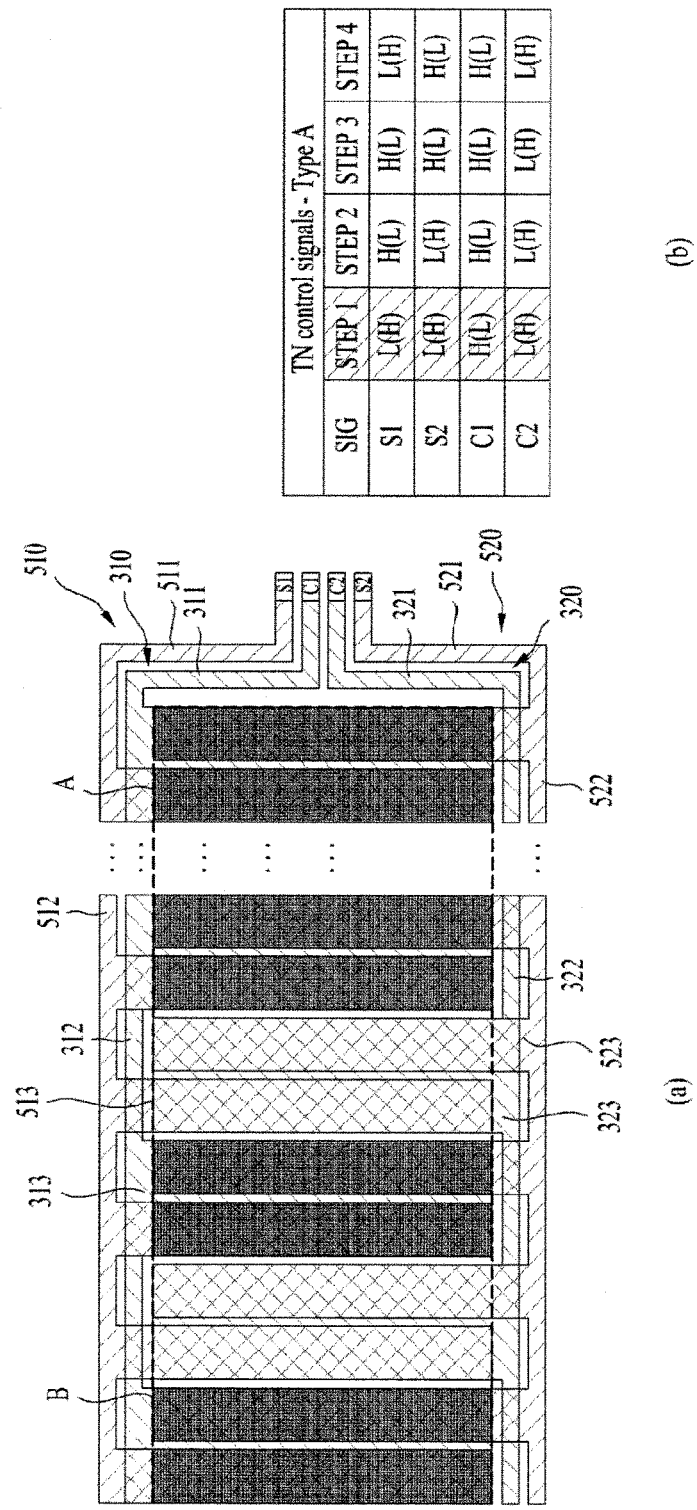

FIG. 14 is a view showing a state in which the barrier patterns are formed at a specific step in the structure of FIG. 13. A table of FIG. 14 shows the change in voltage applied to the one-side electrode 300 and the opposite-side electrode 500 in a case in which the barrier patterns are formed and a state of arrangement of the barrier patterns is changed.

In a case in which high (or low) potential voltage is applied to the first one-side electrode, and low (or high) potential voltage is applied to the second one-side electrode and the first and second opposite-side electrodes, as at a first step of FIG. 14, barrier patterns B appear, as shown in FIG. 14.

At the first step, the barrier patterns B appear between the first one-side extension electrodes and the first and second opposite-side electrodes, and do not appear in the remaining portions.

The portions at which the barrier patterns B do not appear may function as slits, through which a viewer may view left and right images.

The barrier patterns are shifted to one side (the right in this figure) based on whether voltage is applied to the one-side electrode 300 and the opposite-side electrode 500 at second to fourth steps, unlike the first step.

Hereinafter, the shift of the barrier patterns will be described in detail.

FIGS. 15(a) to 15(d) respectively show first to fourth steps at which the barrier patterns are arranged.

In the table, a first row indicates front views showing the arrangement of the barrier patterns, a second row indicates side views showing the arrangement of the barrier patterns, and a third row indicates driving signals. In the driving signals, 'l' indicates high potential voltage, and 'H' indicates low potential voltage. In a case in which H and L overlap each other, barrier patterns are formed in the liquid crystal unit. In addition, S1 may be connected to the first opposite-side extension electrodes 513 in order to selectively apply voltage thereto, S2 may be connected to the second opposite-side extension electrodes 523 in order to selectively apply voltage thereto, C1 may be connected to the first one-side extension electrodes 313 in order to selectively apply voltage thereto, and C2 may be connected to the second one-side extension electrodes 323 in order to selectively apply voltage thereto.

When voltage is applied to arrange the barrier patterns at the first step, as shown in FIG. 15(a), control is performed to generate a potential difference between the first one-side extension electrodes 313 and the first opposite-side extension electrodes 513 and between the first one-side extension electrodes 313 and the second opposite-side extension electrodes 523 such that the barrier patterns are formed.

At this time, high (or low) potential voltage is applied to the first one-side extension electrodes 313, and low (or high) potential voltage is applied to the other electrodes.

On the other hand, control is performed such that a potential difference is not generated between the second one-side extension electrodes 323 and the first opposite-side extension electrodes 513 and between the second one-side extension electrodes 323 and the second opposite-side extension electrodes 523 such that the barrier patterns are not formed. These portions function as slits, through which light is transmitted.

Meanwhile, when the barrier patterns are shifted by one column at the first step, a second step arrangement of the barrier patterns is achieved.

To this end, as shown in FIG. 15(b), high (or low) voltage may be applied to the first one-side extension electrodes 313 and the first opposite-side extension electrodes 513, and low (or high) voltage may be applied to the second one-side extension electrodes 323 and the second opposite-side extension electrodes 523.

In this case, the barrier patterns are formed between the first one-side extension electrodes 313 and the second opposite-side extension electrodes 523 and between the second one-side extension electrodes 323 and the first opposite-side extension electrodes 513.

Figure 15:
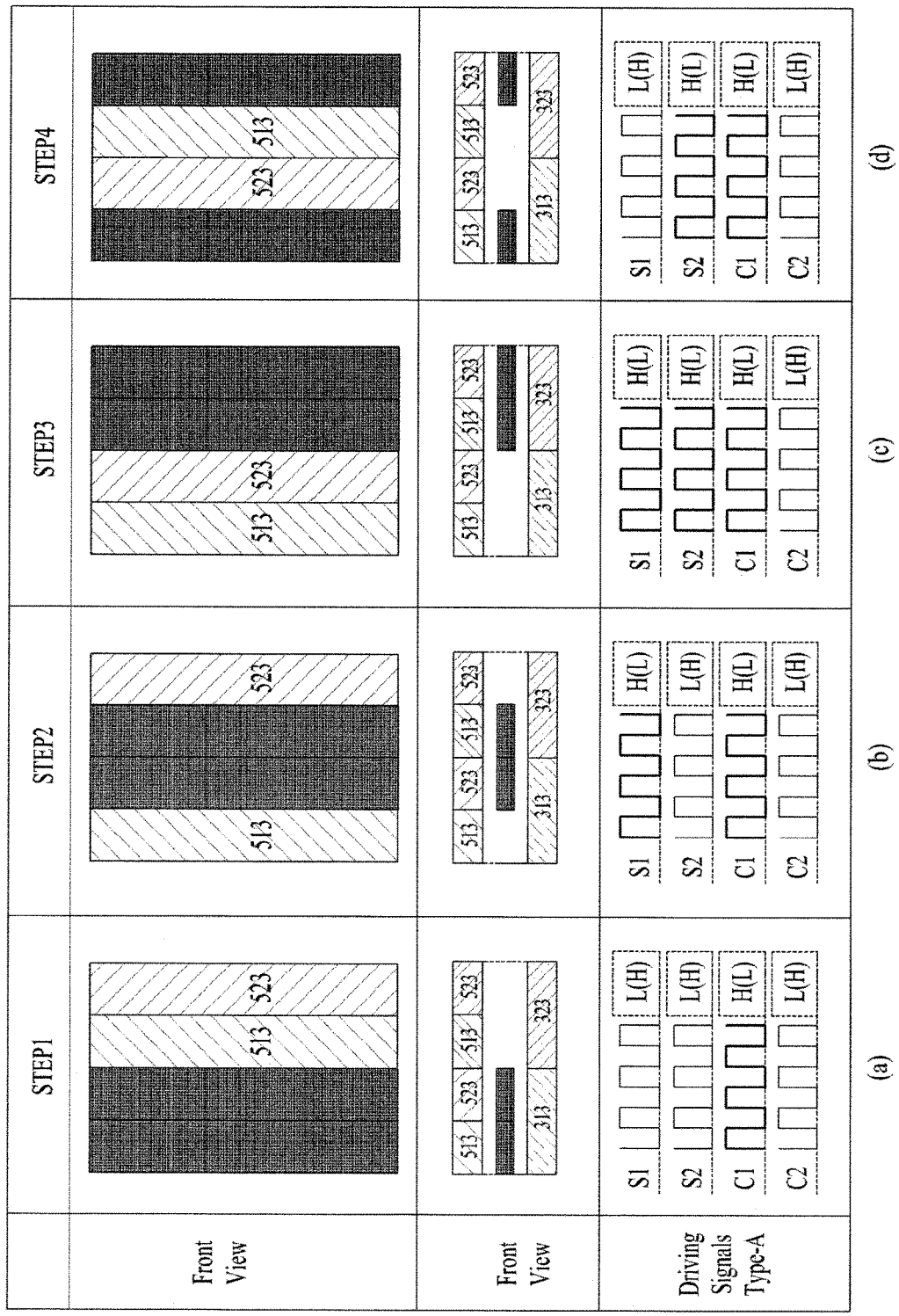

Meanwhile, a third step arrangement of the barrier patterns, which is achieved by shifting the barrier patterns by one column at the second step, and a fourth step arrangement of the barrier patterns, which is achieved by shifting the barrier patterns by one column at the third step, may be equally described based on the above description and illustration of FIG. 15.

In the above embodiment, the barrier patterns are shifted at four steps using a structure in which one extension electrode of the one-side (opposite-side) electrode corresponds to two extension electrodes of the opposite-side (one-side) electrode. Alternatively, in a case in which a structure in which one extension electrode of the one-side (opposite-side) electrode corresponds to three extension electrodes of the opposite-side (one-side) electrode or a structure in which one extension electrode of the one-side (opposite-side) electrode corresponds to four extension electrodes of the opposite-side (one-side) electrode is used, it is possible to further increase the number of steps at which the barrier patterns are shifted.

Third Embodiment

Figure 16:
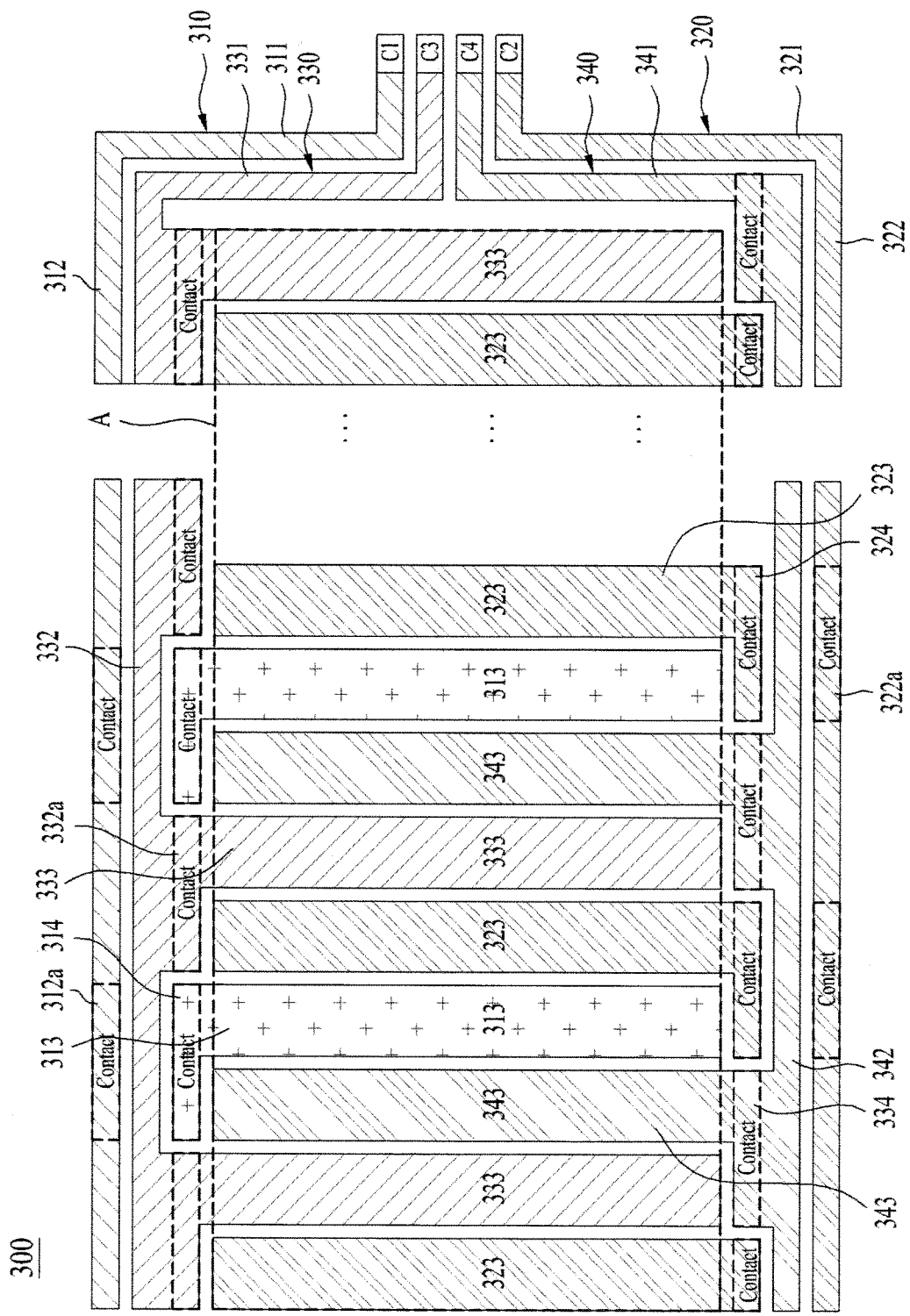
FIGS. 16 to 21 are views illustrating a third embodiment of the present invention.
Figure 17:
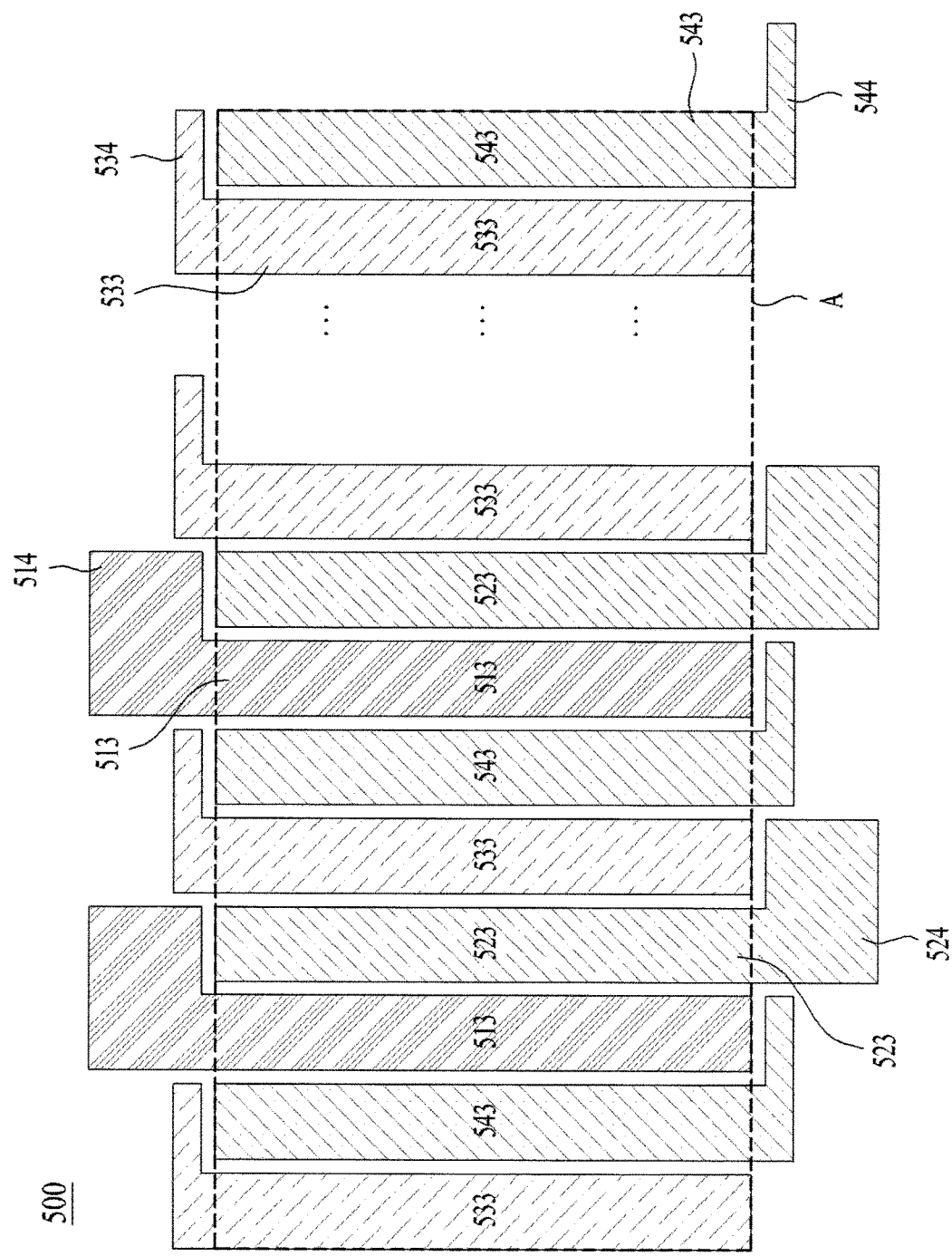

FIGS. 16 and 17 are views illustrating the construction of a one-side electrode and an opposite-side electrode according to another embodiment of the present invention.

As shown in FIG. 16, a one-side electrode 300 may include a first one-side electrode 310, a second one-side electrode 320, a third one-side electrode 330, and a fourth one-side electrode 340, which are separated from one another. The respective one-side electrodes 310 to 340 may be spaced apart and separated from one another by a predetermined pattern.

First to fourth electrode terminals C1 to C4 for applying voltage signals or pulse signals to the first to fourth one-side electrodes 310 to 340, respectively, may be provided beside the one-side electrode 300.

First, the structural elements and arrangement of the first one-side electrode 310 will be described in detail.

The first one-side electrode 310 may include a first one-side connection electrode 311, which is connected to the first one-side electrode terminal C1, a first one-side guide electrode 312, which is connected to the first one-side connection electrode 311, and first one-side extension electrodes 313, which are spaced apart from the first one-side guide electrode 312 and extend in a specific direction (downward in this figure).

The first one-side extension electrodes 313 may not be connected to the first one-side guide electrode 312, but may be spaced apart from the first one-side guide electrode 312. A third one-side guide electrode 332, which will hereinafter be described, may be interposed between the first one-side extension electrodes 313 and the first one-side guide electrode 312. In addition, the connection between the first one-side extension electrodes 313 and the first one-side guide electrode 312 may be achieved using first opposite-side contact electrodes 514, which will hereinafter be described.

At portions of the third one-side guide electrode 332 that are covered by the first opposite-side contact electrodes 514 may be disposed insulators (not shown) for performing an insulation function to prevent electric conduction therebetween.

Each of the first one-side extension electrodes 313 may be formed to have a '┐' shape. At the upper ends of the first one-side extension electrodes 313 may be provided first one-side contact electrodes 314, which electrically conductively contact the first opposite-side contact electrodes 514.

At the first one-side guide electrode 312 may also be provided first one-side contact parts 312a, each of which has a width equivalent to that of a corresponding one of the first one-side contact electrodes 314 and which electrically conductively contact the first opposite-side extension electrodes 513.

The width of each of the first one-side contact electrodes 314 may be greater than that of a corresponding one of the first one-side extension electrodes 313. The width of each of the first one-side contact electrodes 314 may be equivalent to the sum of the width of a corresponding fourth one-side extension electrode 343, the width of a corresponding one of the first one-side extension electrodes 313, and the width of a pattern therebetween.

The structural elements and arrangement of the second one-side electrode 320 will be described in detail.

The second one-side electrode 320 may include a second one-side connection electrode 321, which is connected to the second one-side electrode terminal C2, a second one-side guide electrode 322, which is connected to the second one-side connection electrode 321, and second one-side extension electrodes 323, which are spaced apart from the second one-side guide electrode 322 and extend in a specific direction (upward in this figure). The second one-side extension electrodes 323 may not be connected to the second one-side guide electrode 322, but may be spaced apart from the second one-side guide electrode 322. A fourth one-side guide electrode 342, which will hereinafter be described, may be interposed between the second one-side extension electrodes 323 and the second one-side guide electrode 322. In addition, the connection between the second one-side extension electrodes 323 and the second one-side guide electrode 322 may be achieved using second opposite-side contact electrodes 524, which will hereinafter be described. At portions of the fourth one-side guide electrode 342 that are covered by the second opposite-side contact electrodes 524 may be disposed insulators for preventing electric conduction therebetween.

Each of the second one-side extension electrodes 323 may be formed to have a '⌐' shape. At the lower ends of the second one-side extension electrodes 323 may be provided second one-side contact electrodes 324, which electrically conductively contact the second opposite-side contact electrodes 524.

At the second one-side guide electrode 322 may also be provided second one-side contact parts 322a, each of which has a width equivalent to that of a corresponding one of the second one-side contact electrodes 324 and which electrically conductively contact the second opposite-side extension electrodes 523.

The width of each of the second one-side contact electrodes 324 may be greater than that of a corresponding one of the second one-side extension electrodes 323. The width of each of the second one-side contact electrodes 324 may be equivalent to the sum of the width of a corresponding one of the first one-side extension electrodes 313, the width of a corresponding one of the first one-side extension electrodes 313, and the width of a pattern therebetween.

Meanwhile, the third one-side electrode 330 may include a third one-side connection electrode 331, which is connected to the third one-side electrode terminal C3, a third one-side guide electrode 332, which is connected to the third one-side connection electrode 331, and third one-side extension electrodes 333, which are connected to the third one-side guide electrode 332 and extend in a specific direction (downward in this figure). The third one-side guide electrode 332 may be disposed further inward than the first one-side guide electrode 312, and the third one-side connection electrode 331 may also be disposed further inward than the first one-side connection electrode 311.

Each of the third one-side extension electrodes 333 may be formed to have a '⌐' shape. At the upper ends of the third one-side extension electrodes 333 may be provided third one-side contact electrodes 334, which electrically conductively contact third opposite-side contact electrodes 534, which will hereinafter be described.

The width of each of the third one-side contact electrodes 334 may be greater than that of a corresponding one of the third one-side extension electrodes 333. The width of each of the third one-side contact electrodes 334 may be equivalent to the sum of the width of a corresponding second one-side extension electrode 323, the width of a corresponding one of the first one-side extension electrodes 313, and the width of a pattern therebetween.

Recesses, in which the first one-side contact electrodes 314 are disposed, may be formed at the third one-side guide electrode 332.

The fourth one-side electrode 340 may include a fourth one-side connection electrode 341, which is connected to the fourth one-side electrode terminal C4, a fourth one-side guide electrode 342, which is connected to the fourth one-side connection electrode 341, and fourth one-side extension electrodes 343, which are directly connected to the fourth one-side guide electrode 342 and extend in a specific direction (upward in this figure). The fourth one-side guide electrode 342 may be disposed further inward than the second one-side guide electrode 322, and the fourth one-side connection electrode 341 may also be disposed further inward than the second one-side connection electrode 321.

Each of the fourth one-side extension electrodes 343 may be formed to have a '⌐' shape. At the lower ends of the fourth one-side extension electrodes 343 may be provided fourth one-side contact electrodes 344, which electrically conductively contact fourth opposite-side contact electrodes 544, which will hereinafter be described.

The width of each of the fourth one-side contact electrodes 344 may be greater than that of a corresponding one of the fourth one-side extension electrodes 343. The width of each of the fourth one-side contact electrodes 344 may be equivalent to the sum of the width of a corresponding one of the third one-side extension electrodes 333, the width of a corresponding one of the fourth one-side extension electrodes 313, and the width of a pattern therebetween.

In the one-side electrode 30, the first to fourth one-side extension electrodes 313, 323, 333, and 343 may be sequentially and repeatedly arranged.

In addition, the first to fourth one-side extension electrodes 313, 323, 333, and 343 may be spaced apart from one another.

In FIG. 16, part A indicated by a dotted-line rectangle is an effective activation region, in which barrier patterns are effectively formed.

FIG. 17 is a view showing an opposite-side electrode 500.

The opposite-side electrode 500 may include first to fourth opposite-side extension electrodes 513, 523, 533, and 543. First to fourth opposite-side contact electrodes 514, 524, 534, and 544 may be provided at the upper ends or the lower ends of the respective opposite-side extension electrodes 513, 523, 533, and 543.

The first opposite-side extension and contact electrodes 513 and 514 and the third opposite-side extension and contact electrodes 533 and 534 may be formed to have a '⌐' shape, and the second opposite-side extension and contact electrodes 523 and 524 and the fourth opposite-side extension and contact electrodes 543 and 544 may be formed to have a '⌐' shape.

Meanwhile, the width of each of the opposite-side contact electrodes 514 to 544 may be equivalent to the sum of the width of a specific one of the opposite-side extension electrodes connected thereto and an adjacent one of the opposite-side extension electrodes.

Meanwhile, the vertical height of the first and second opposite-side contact electrodes 514 and 524 may be greater than that of the third and fourth opposite-side contact electrodes 534 and 544.

The vertical heights of the opposite-side contact electrodes are defined, as described above, in order to electrically conductively connect the first and second one-side extension electrodes 313 and 323 to the first and second one-side guide electrodes 312 and 322 and to electrically conductively connect the first and second opposite-side extension electrodes 513 and 523 to the first and second one-side extension electrodes 313 and 323 and the first and second one-side guide electrodes 312 and 322.

Consequently, the first and second opposite-side contact electrodes 514 and 524 electrically conductively contact the first and second one-side contact electrodes 314 and 324 and the first and second one-side contact parts 312*a* and 322*a*, which are shown in FIG. 5. Similarly, the third and fourth opposite-side contact electrodes 534 and 544 electrically conductively contact the third and fourth one-side contact electrodes 334 and 344, which are shown in FIG. 16. As a result, the first one-side extension electrodes 313 are electrically conductively connected to the first opposite-side extension electrodes 513. The same is applied to the other extension electrodes.

In FIG. 16, part A indicated by a dotted-line rectangle is an effective activation region, in which barrier patterns are effectively formed.

Figure 18:
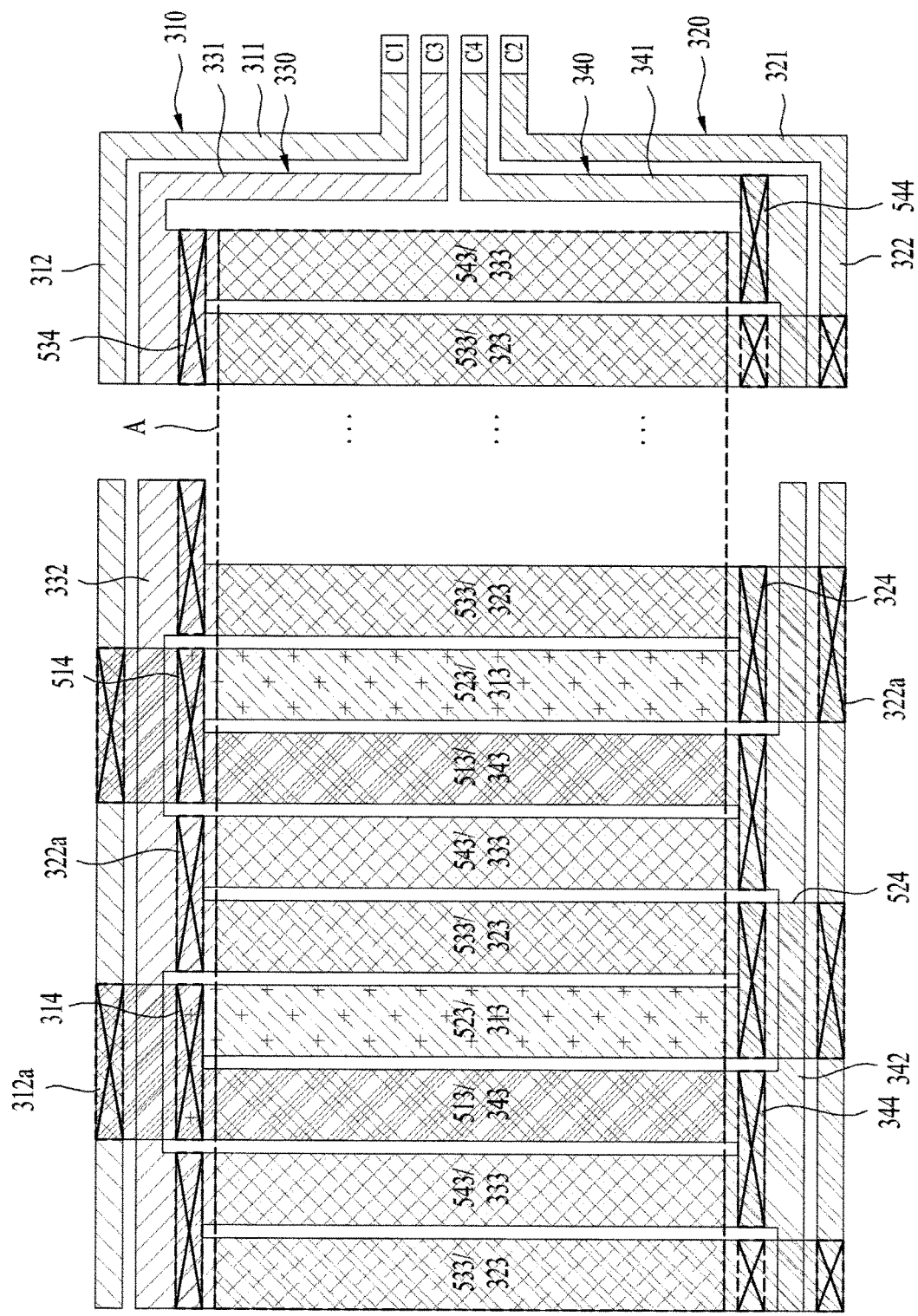
Figure 19:
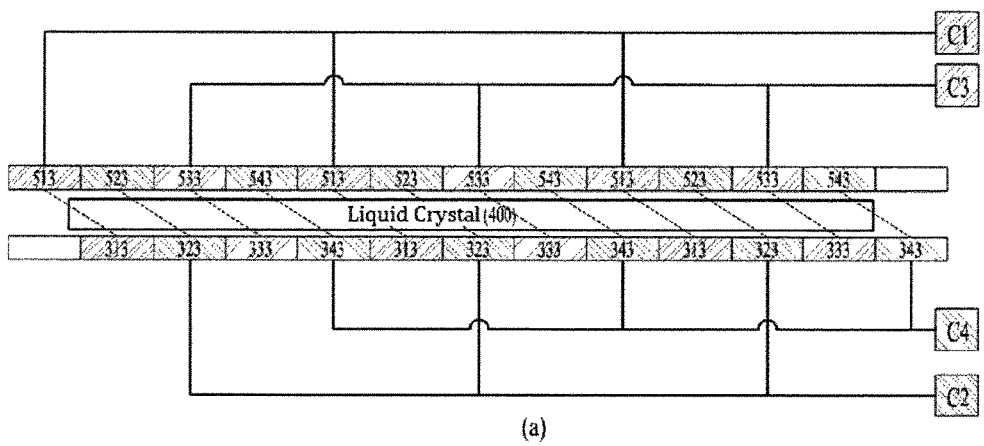

FIG. 18 is a front view showing a state in which the one-side electrode of FIG. 16 and the opposite-side electrode of FIG. 17 overlap each other. FIG. 19(*a*) is a plan sectional view showing such an overlapping state, and FIG. 19(*b*) is a table showing signals applied to the terminals at the respective barrier pattern shift steps.

Figure 20:
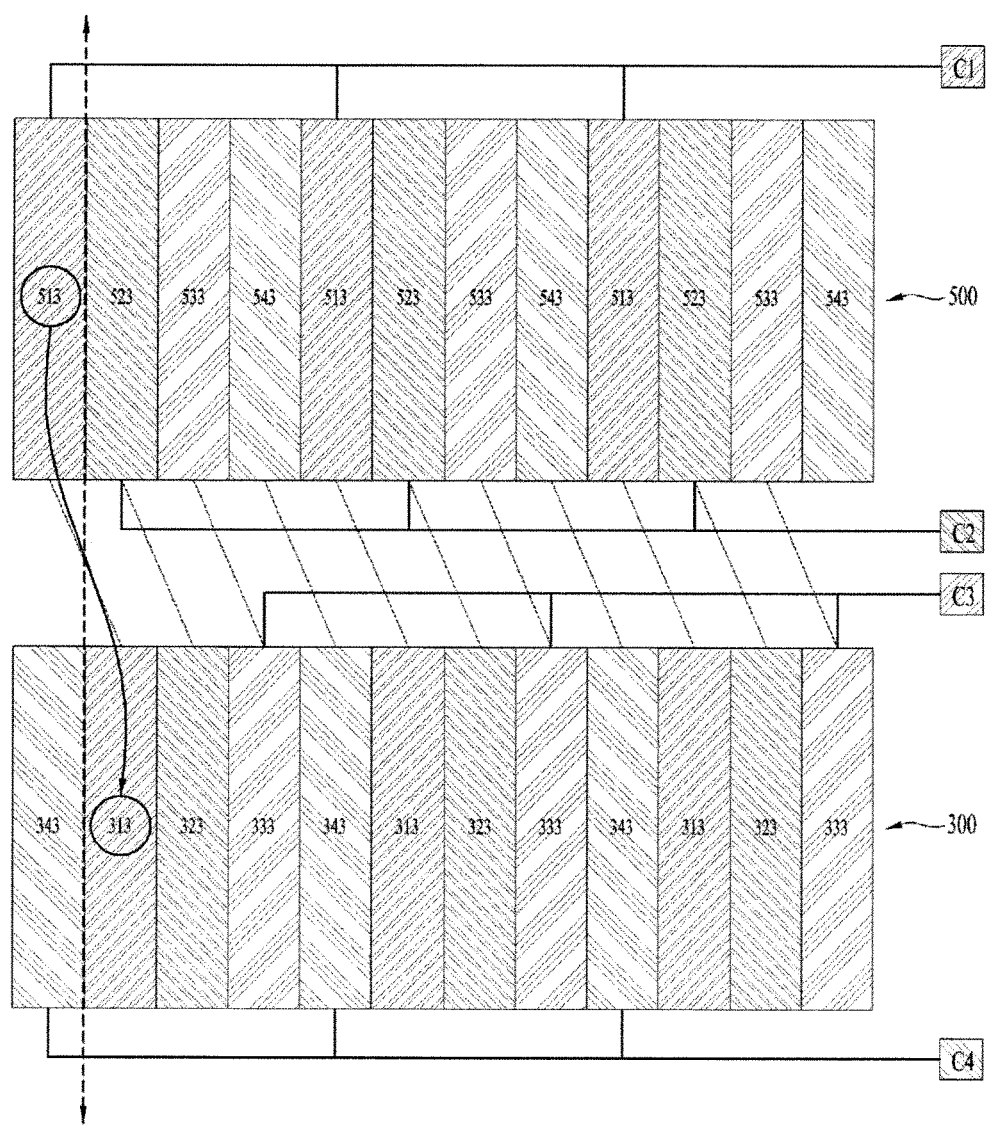

FIG. 20 is a view showing a state in which the one-side electrode 300 and the opposite-side electrode 500 are separated from each other while overlapping therebetween is maintained.

Hereinafter, the overlapping structure will be described in detail with reference to FIGS. 18 to 20.

In this embodiment, a single one-side electrode 300 and a single opposite-side electrode 500 overlap each other to constitute a single electrode module. The one-side electrode 300 and the opposite-side electrode 500 may not partially overlap each other, but may completely overlap each other.

Overlapping between the one-side electrode and the opposite-side electrode is achieved as follows.

The first one-side extension electrodes 313 may overlap the second opposite-side extension electrodes 523, and the second one-side extension electrodes 323 may overlap the third opposite-side extension electrodes 533. In addition, the third one-side extension electrodes 333 may overlap the fourth opposite-side extension electrodes 543, and the fourth one-side extension electrodes 343 may overlap the first opposite-side extension electrodes 513.

That is, one-side extension electrodes having a specific order do not overlap opposite-side extension electrodes having the same order, but overlap opposite-side extension electrodes having an order next to the specific order. In brief, one-side extension electrodes having a specific order and opposite-side extension electrodes having the same order may be arranged such that the opposite-side extension electrodes are shifted from the one-side extension electrodes by one column.

When the overlapping structure is viewed from the front or the rear thereof, the first one-side extension electrodes 313 and the first opposite-side extension electrodes 513 may be arranged such that the first one-side extension electrodes 313 and the first opposite-side extension electrodes 513 neighbor each other. The same is applied to one-side and opposite-side extension electrodes having other orders.

In the above structure, the first opposite-side contact electrodes 514 may electrically conductively contact the first one-side contact electrodes 314 and the first one-side contact parts 312*a*. As a result, the first one-side extension electrodes 313 and the first opposite-side extension electrodes 513 may be electrically conducted to each other, whereby the same voltage or pulse signal may be applied thereto. The same is applied to one-side extension electrodes and opposite-side extension electrodes having other orders.

In this way, a state of arrangement of the barrier patterns may be changed based on overlap of the extension electrodes and the change in voltages or pulses applied thereto.

Hereinafter, the change in arrangement of the barrier patterns based on selective application of voltage when the direction of user's gaze is changed in this embodiment will be described with reference to FIGS. 19(*b*) and 21.

Figure 21:
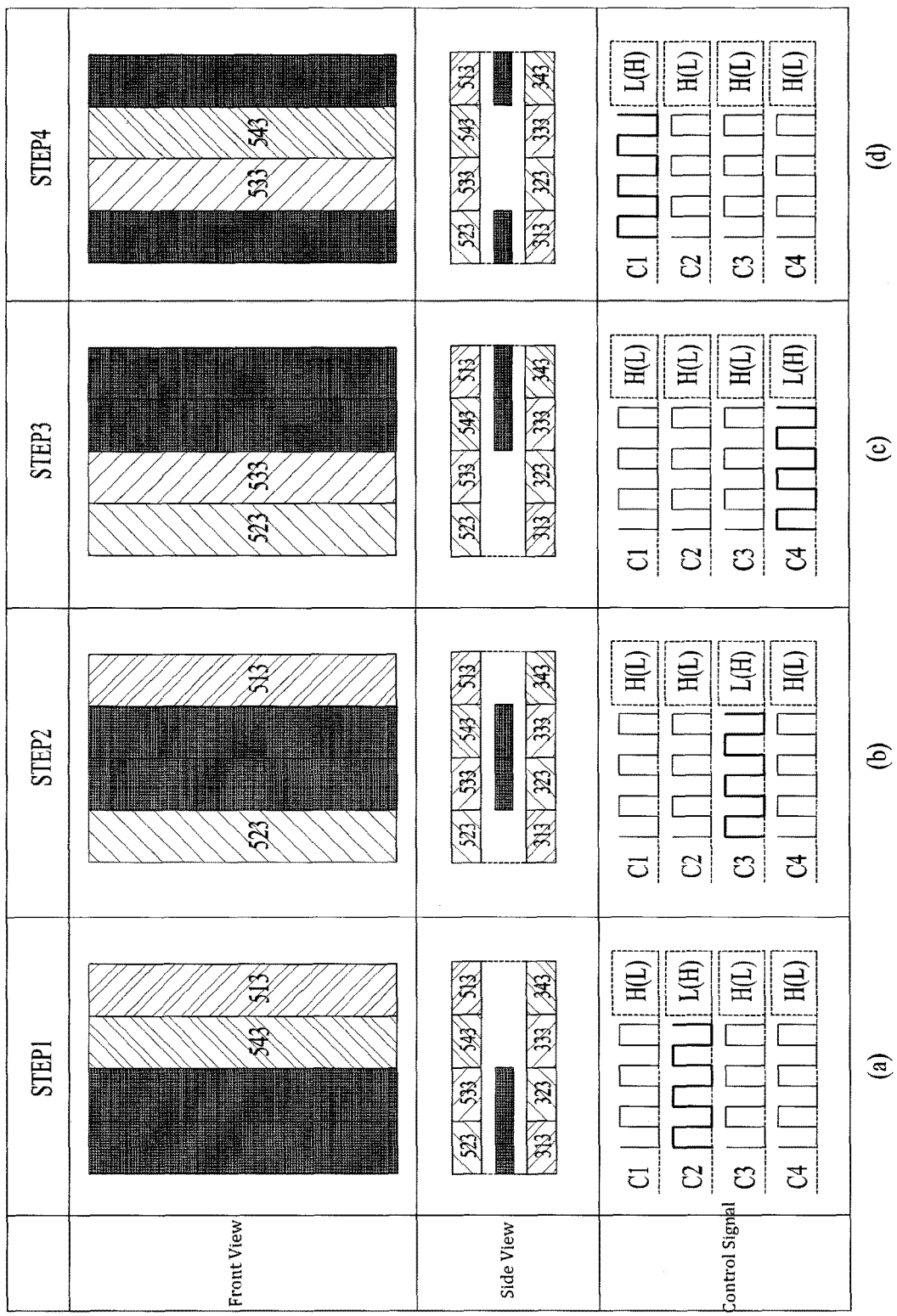

FIGS. 21(*a*) to 21(*d*) respectively show first to fourth steps at which the barrier patterns are arranged.

In the table, a first row indicates front views showing the arrangement of the barrier patterns, a second row indicates side views showing the arrangement of the barrier patterns, and a third row indicates states of control signals. In the driving signals, 'L' indicates high potential voltage, and 'H' indicates low potential voltage. In a case in which H and L overlap each other, barrier patterns are formed in the liquid crystal unit. The first electrode terminal C1 may apply voltage or pulse signals to the first one-side and opposite-side extension electrodes 313 and 513, and the second electrode terminal C2 may apply voltage or pulse signals to the second one-side and opposite-side extension electrodes 323 and 523. The third electrode terminal C3 may apply voltage or pulse signals to the third one-side and opposite-side extension electrodes 333 and 533, and the fourth electrode terminal C4 may apply voltage or pulse signals to the fourth one-side and opposite-side extension electrodes 343 and 543.

When voltage is applied to arrange the barrier patterns at the first step, as shown in FIG. 20(*a*), control is performed to generate a potential difference between the first one-side extension electrodes 313 and the second opposite-side extension electrodes 523 and between the second one-side extension electrodes 323 and the third opposite-side extension electrodes 533 such that the barrier patterns are formed.

At this time, low (or high) potential voltage is applied to the second one-side extension electrodes 323 and the second opposite-side extension electrodes 523, and high (or low) potential voltage is applied to the other electrodes.

On the other hand, control is performed so as not to generate a potential difference between the third one-side extension electrodes 333 and the fourth opposite-side extension electrodes 543 and between the fourth one-side extension electrodes 343 and the first opposite-side extension electrodes 513 such that the barrier patterns are not formed. These portions function as slits, through which light is transmitted.

Meanwhile, when the barrier patterns are shifted by one column at the first step, a second step arrangement of the barrier patterns is achieved.

To this end, as shown in FIG. 21(*b*), low (or high) voltage may be applied to the third one-side extension electrodes 333 and the third opposite-side extension electrodes 533, and high (or low) voltage may be applied to the other extension electrodes.

In this case, the barrier patterns are formed between the second one-side extension electrodes 323 and the third opposite-side extension electrodes 533 and between the third one-side extension electrodes 333 and the fourth opposite-side extension electrodes 543.

Meanwhile, a third step arrangement of the barrier patterns, which is achieved by shifting the barrier patterns by one column at the second step, and a fourth step arrangement of the barrier patterns, which is achieved by shifting the barrier patterns by one column at the third step, may be equally described based on the above description and illustration of FIGS. 18 to 21.

The structures of the electrodes according to the third embodiment of the present invention as described above may be summarized as follows.

A plurality of extension electrodes of a one-side electrode may be classified as first to N-th extension electrodes arranged in a specific arrangement order. In addition, a plurality of extension electrodes of an opposite-side electrode may also be classified as first to N-th extension electrodes arranged in a specific arrangement order. In this embodiment, the same voltage or pulse may be applied to a certain extension electrode of the one-side electrode (e.g. an i-th extension electrode ($1 =< i < N$)) and an (i+1)-th extension electrode of the opposite-side electrode. That is, in a case in which the extension electrodes of the one-side electrode and the opposite-side electrode are numbered in the order in which they are arranged, neighboring extension electrodes may be electrically conductively connected to each other.

In a case in which, in this state, electric potential applied to one of the four successive extension electrodes of the one-side electrode, and electric potential different from the electric potential applied to the one of the four successive extension electrodes of the one-side electrode is applied to the other extension electrodes of the one-side electrode, it is possible to form barrier patterns that are changed as shown in FIG. 21.

Fourth Embodiment

Figure 22:
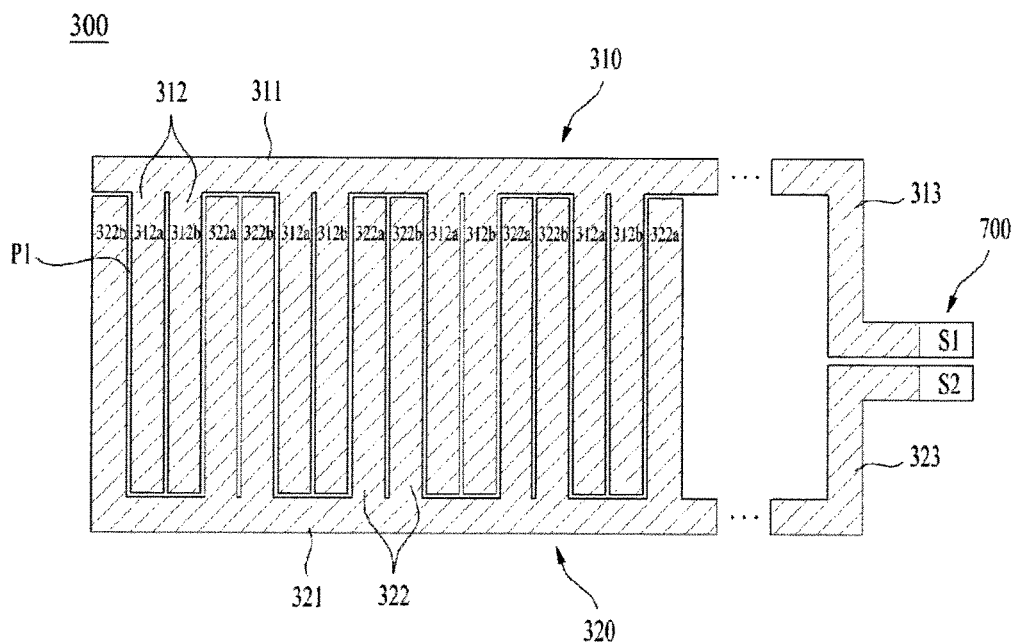
Figure 23:
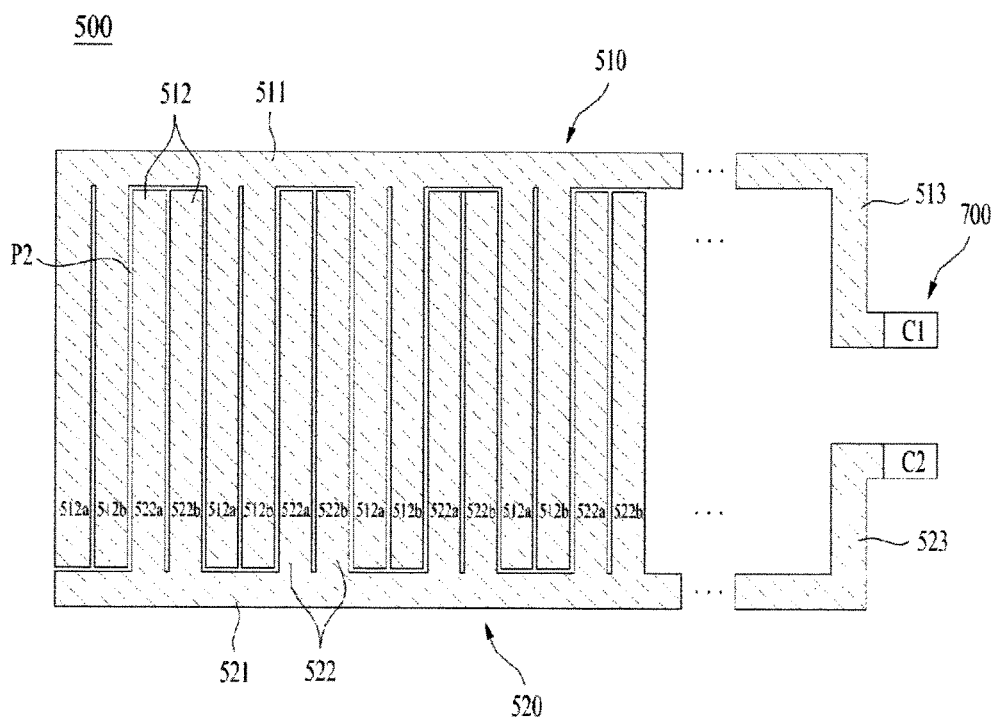

FIGS. 22 and 23 are views illustrating a one-side electrode and an opposite-side electrode according to a further embodiment of the present invention.

As shown in FIG. 22, a one-side electrode 300 may include a first one-side electrode 310 and a second one-side electrode 320, which are separated from each other. The first one-side electrode 310 and the second one-side electrode 320 may be separated from each other by a first pattern P1 for separating the first one-side electrode 310 and the second one-side electrode 320 from each other to prevent electric conduction between the first one-side electrode 310 and the second one-side electrode 320. The first pattern P1 may include horizontal pattern parts, which are formed horizontally, and vertical pattern parts, which are formed vertically.

A terminal unit 700 for applying voltage to the one-side electrode 300 and the opposite-side electrode 500 may be provided beside the one-side electrode 300. The terminal unit 700 may include four separate terminals, which are integrated into a flexible printed circuit board (FPCB).

The terminal unit 700 may include a first one-side terminal S1 and a second one-side terminal S2. The first one-side terminal S1 may be electrically conductively connected to the first one-side electrode 310, and the second one-side terminal S2 may be electrically conductively connected to the second one-side electrode 320.

The first one-side electrode 310 may include a first one-side guide electrode 311, which is provided horizontally, a plurality of first one-side extension electrodes 312, which extends perpendicularly from the first one-side guide electrode 311, and a first one-side connection electrode 313 for connecting the first one-side guide electrode 311 to the first one-side terminal S1.

The first one-side extension electrodes 312 may be spaced apart from each other by a predetermined distance in leftward and rightward directions.

The first one-side extension electrodes 312 may be arranged such that every two first one-side extension electrodes 312 spaced apart from each other form a pair. That is, a first one-side extension electrode denoted by reference symbol 312a and another first one-side extension electrode denoted by reference symbol 312b may form a pair. A plurality of pairs of first one-side extension electrodes 312 may be spaced apart from each other such that the pairs of first one-side extension electrodes 312 can be distinguished from each other.

The distance between the pairs of first one-side extension electrodes 312 may be considerably greater than that between two first one-side extension electrodes 312 forming each pair.

As will hereinafter be described in detail, a pair of second one-side extension electrodes 322 may be interposed between one pair of one-side extension electrodes 312 and another pair of one-side extension electrodes 312 which neighbor each other.

The second one-side electrode 320 may be disposed under the first one-side electrode 310 such that the second one-side electrode 320 is engaged with the first one-side electrode 310. The second one-side electrode 320 is not actually engaged with the first one-side electrode 310 like a gear. Since the second one-side electrode 320 and the first one-side electrode 310 are shown as filling an empty space therebetween, the second one-side electrode 320 is described as being engaged with the first one-side electrode 310.

Since the first one-side electrode 310 and the second one-side electrode 320 are spaced apart from each other by the first pattern P1, as described above, the first one-side electrode 310 and the second one-side electrode 320 may not be electrically conducted to each other.

The second one-side electrode 320 may also include a second one-side guide electrode 321, which is provided horizontally, a plurality of second one-side extension electrodes 322, which extends perpendicularly from the second one-side guide electrode 321, and a second one-side connection electrode 323 for connecting the second one-side guide electrode 321 to the second one-side terminal S2. The second one-side extension electrodes 322 may be spaced apart from each other by a predetermined distance in leftward and rightward directions.

The second one-side extension electrodes 322 may also be arranged such that every two second one-side extension electrodes 322 spaced apart from each other form a pair. That is, a second one-side extension electrode denoted by reference symbol 322a and another second one-side extension electrode denoted by reference symbol 322b may form a pair. A plurality of pairs of second one-side extension electrodes 322 may be spaced apart from each other such that the pairs of second one-side extension electrodes 322 can be distinguished from each other. The distance between the pairs of second one-side extension electrodes 322 may be considerably greater than that between two second one-side extension electrodes 322 forming each pair.

As a result, the first one-side electrode 310 and the second one-side electrode 320 may be disposed in the same plane, the first one-side extension electrodes 311 may be arranged on the plane, and the second one-side extension electrodes 321 may be arranged under the plane.

In addition, the first one-side connection electrode 313 may be disposed at the upper side of the side surface part at which the terminal unit 700 is disposed, and the second one-side connection electrode 323 may be disposed at the lower side of the side surface part at which the terminal unit 700 is disposed.

In addition, a pair of second one-side extension electrodes 322 (322a and 322b) may be disposed beside a pair of first one-side extension electrodes 312 (312a and 312b). This arrangement may be repeated in leftward and rightward directions.

FIG. 23 is a view showing the construction of the opposite-side electrode 500.

As shown in FIG. 23, the opposite-side electrode 500 may also include a first opposite-side electrode 510 and a second opposite-side electrode 520, which are separated from each other. The first opposite-side electrode 510 and the second opposite-side electrode 520 may be separated from each other by a second pattern P2 for separating the first opposite-side electrode 510 and the second opposite-side electrode 520 from each other to prevent electrical conduction between the first opposite-side electrode 510 and the second opposite-side electrode 520. The second pattern P2 may be formed to have a predetermined thickness. The second pattern P2 may include horizontal pattern parts P2a, which are formed horizontally, and vertical pattern parts P2b, which are formed vertically.

A terminal unit 700 for applying voltage to the one-side electrode 300 and the opposite-side electrode 500 may also be provided beside the opposite-side electrode 500. The terminal unit 700 may also include a first opposite-side terminal C1 and a second opposite-side terminal C2 in addition to the first one-side terminal S1 and the second one-side terminal S2.

The first opposite-side terminal C1 may be electrically conductively connected to the first opposite-side electrode 510, and the second opposite-side terminal C2 may be electrically conductively connected to the second opposite-side electrode 520.

The first opposite-side electrode 510 may include a first opposite-side guide electrode 511, which is provided horizontally, a plurality of first opposite-side extension electrodes 512, which extends perpendicularly from the first opposite-side guide electrode 511, and a first opposite-side connection electrode 513 for connecting the first opposite-side guide electrode 511 to the first opposite-side terminal C1.

The first opposite-side extension electrodes 512 may be spaced apart from each other by a predetermined distance in leftward and rightward directions.

The first opposite-side extension electrodes 512 may be arranged such that every two first opposite-side extension electrodes 512 spaced apart from each other to form a pair. That is, a first opposite-side extension electrode denoted by reference symbol 512a and another first opposite-side extension electrode denoted by reference symbol 512b may form a pair. A plurality of pairs of first opposite-side extension electrodes 512 may be spaced apart from each other such that the pairs of first opposite-side extension electrodes 512 can be distinguished from each other. The distance between the pairs of first opposite-side extension electrodes 512 may be considerably greater than that between two first opposite-side extension electrodes 512 forming each pair.

The second opposite-side electrode 520 may be disposed under the first opposite-side electrode 510 such that the second opposite-side electrode 520 is engaged with the first opposite-side electrode 510. The second opposite-side electrode 520 is not actually engaged with the first opposite-side electrode 510 like a gear. Since the second opposite-side electrode 520 and the first opposite-side electrode 350 are shown as filling an empty space therebetween, the second opposite-side electrode 520 is described as being engaged with the first opposite-side electrode 510.

Since the first opposite-side electrode 510 and the second opposite-side electrode 520 are spaced apart from each other by the first pattern P2, as described above, the first opposite-side electrode 510 and the second opposite-side electrode 520 may not be electrically conducted to each other.

The second opposite-side electrode 520 may also include a second opposite-side guide electrode 521, which is provided horizontally, a plurality of second opposite-side extension electrodes 522, which extends perpendicularly from the second opposite-side guide electrode 521, and a second opposite-side connection electrode 323 for connecting the second opposite-side guide electrode 521 to the second one-side terminal C2. The second opposite-side extension electrodes 522 may be spaced apart from each other by a predetermined distance in leftward and rightward directions.

The second opposite-side extension electrodes 522 may also be arranged such that every two second opposite-side extension electrodes 522 spaced apart from each other form a pair. That is, a second opposite-side extension electrode denoted by reference symbol 522a and another second opposite-side extension electrode denoted by reference symbol 522b may form a pair. A plurality of pairs of second opposite-side extension electrodes 522 may be spaced apart from each other such that the pairs of second opposite-side extension electrodes 522 can be distinguished from each other.

The distance between the pairs of second opposite-side extension electrodes 522 may be considerably greater than that between two second opposite-side extension electrodes 522 forming each pair.

As a result, the first opposite-side electrode 510 and the second opposite-side electrode 520 may be disposed in the same plane, the first opposite-side extension electrodes 511 may be arranged on the plane, and the second opposite-side extension electrodes 521 may be arranged under the plane.

In addition, the first opposite-side connection electrode 513 may be disposed at the upper side of the side surface part at which the terminal unit 700 is disposed, and the second opposite-side connection electrode 523 may be disposed at the lower side of the side surface part at which the terminal unit 700 is disposed.

In addition, a pair of second opposite-side extension electrodes 522 (522a and 522b) may be disposed beside a pair of first opposite-side extension electrodes 512 (512a and 512b). This arrangement may be repeated in the leftward and rightward directions.

As a result, the first one-side electrode 310 and the second one-side electrode 320 may be engaged with each other as shown in FIG. 22, and the first opposite-side electrode 510 and the second opposite-side electrode 520 may be engaged with each other as shown in FIG. 23.

Figure 24:
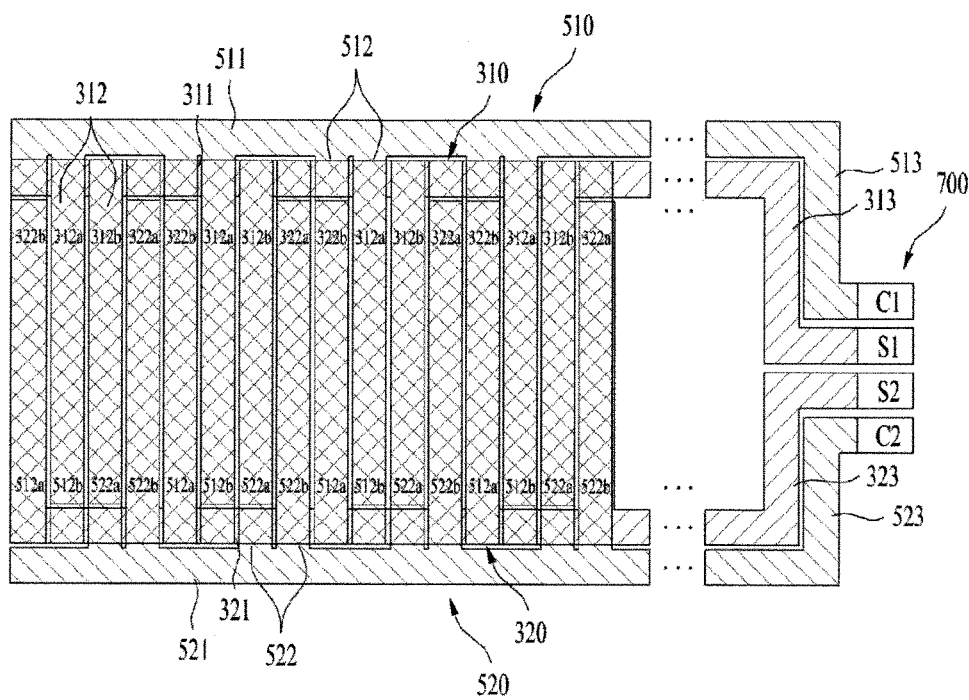
Figure 25:
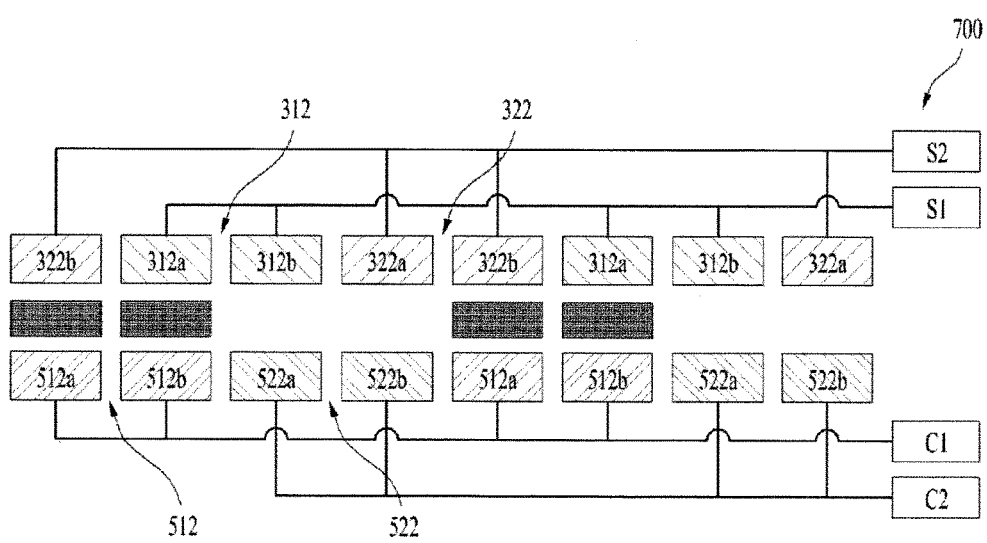
Figure 27:
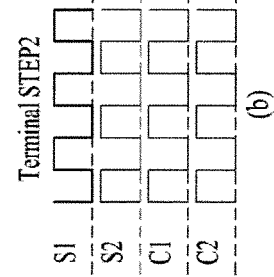
Figure 27:
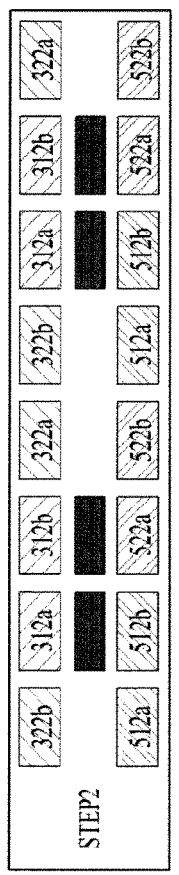
Figure 27:
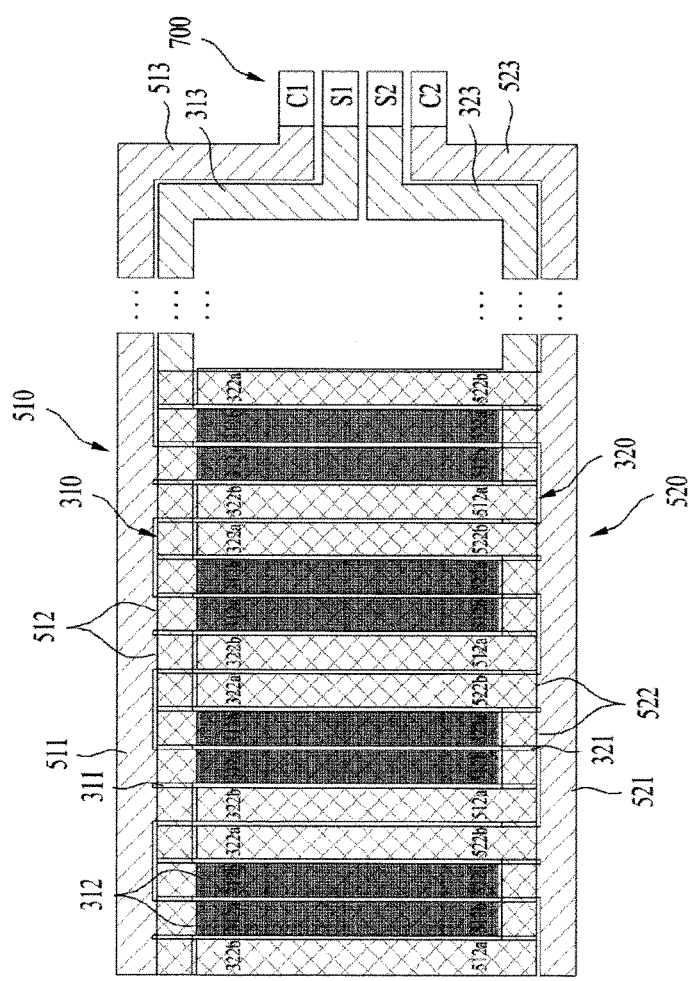
Figure 28:
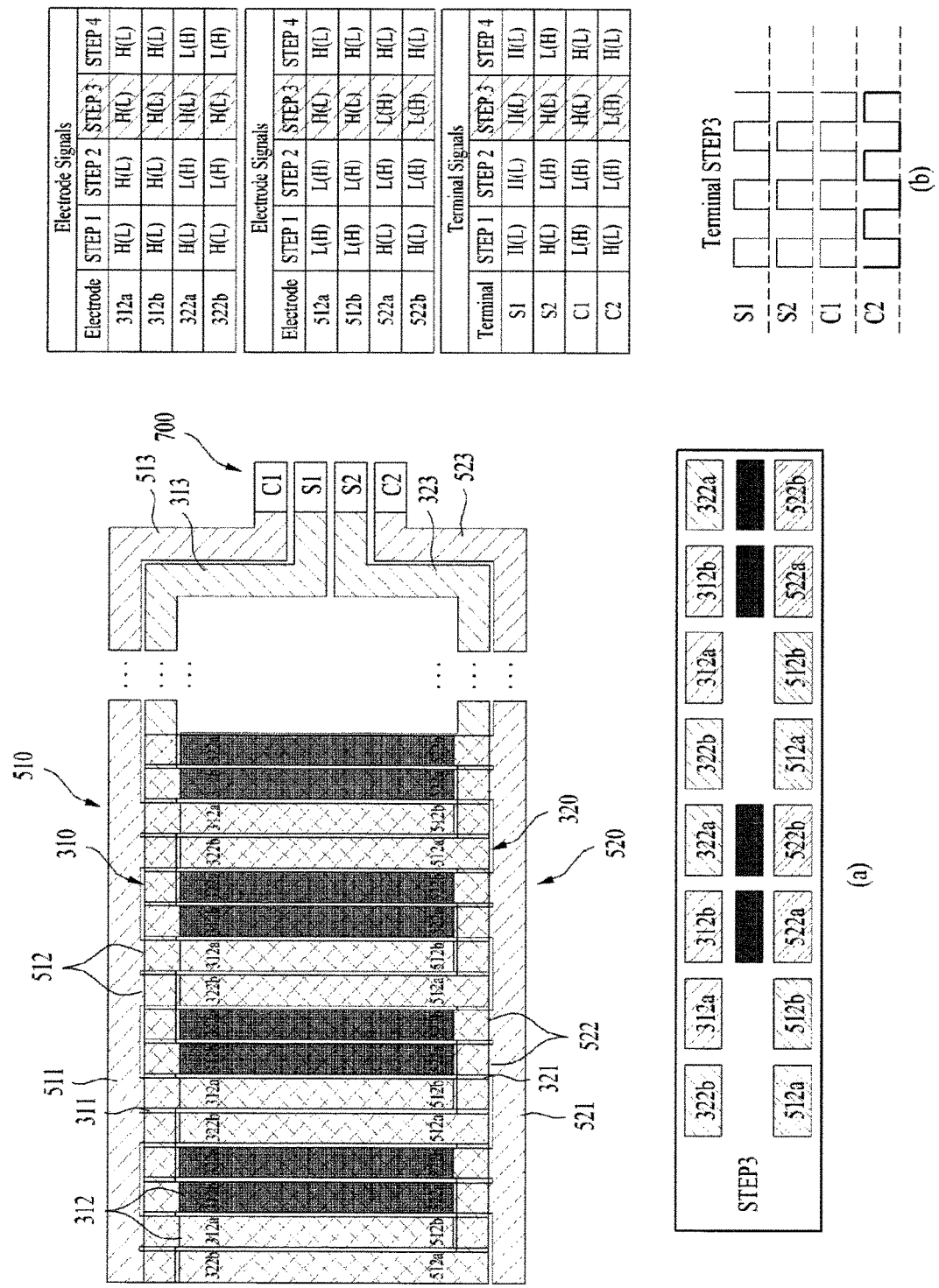
Figure 29:
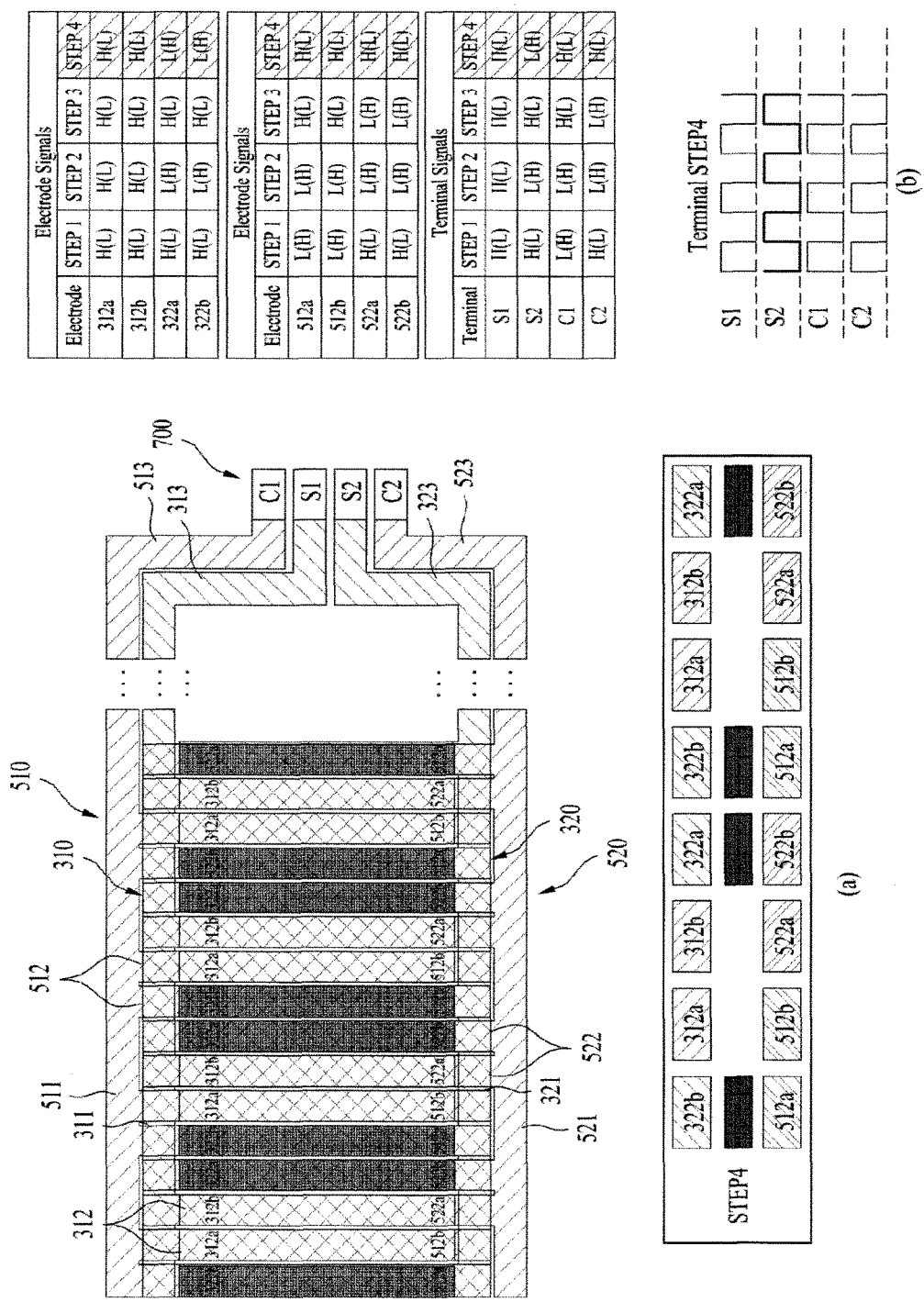

FIGS. 24 and 25 are views showing an example in which the one-side electrode and the opposite-side electrode are stacked in a state in which the liquid crystal unit is disposed therebetween.

The opposite-side electrode 500 may be disposed on the one-side electrode 300. In this case, the first opposite-side guide electrode 511 may be disposed further upward than the first one-side guide electrode 311, and the second opposite-side guide electrode 521 may be disposed further downward than the second one-side guide electrode 321.

In addition, the first opposite-side connection electrode 513 may be disposed outside the first one-side connection electrode 313, and the second opposite-side connection electrode 513 may be disposed outside the second one-side connection electrode 323.

As a result, the one-side extension electrodes 312 and 322 of the one-side electrode 300 may completely overlap the opposite-side extension electrodes 512 and 522 of the opposite-side electrode 500.

As described above, a pair (hereinafter, referred to as a (1-1)-th pair) of two first one-side extension electrodes 312 (312a and 312b) may be adjacent to a pair (hereinafter, referred to as a (1-2)-th pair) of two second one-side extension electrodes 322 (322a and 322b), and a pair (hereinafter, referred to as a (2-1)-th pair) of two second one-side extension electrodes 512 (512a and 512b) may be adjacent to a pair (hereinafter, referred to as a (2-2)-th pair) of two second other-side extension electrodes 522 (522a and 522b).

The extension electrodes are arranged as follows.

The (2-1)-th pair may partially overlap the (1-1)-th pair and the (1-2)-th pair, and the (2-2)-th pair may partially overlap the (1-2)-th pair and the (1-1)-th pair. That is, the (1-1)-th pair (or the (1-2)-th pair) does not fully overlap the (2-1)-th pair or the (2-2)-th pair.

The extension electrodes overlap each other in order to change the position in barrier patterns in a stepwise manner. It is possible to control high potential or low potential voltage signals applied to the terminal unit 700 through the partial overlap of the respective pairs such that the position in barrier patterns can be changed in response to the change in position of the head, face, or eyes of a user.

The overlapping structure will be described in detail.

The (2-1)-th pair may partially overlap the (1-1)-th pair and the (1-2)-th pair. Specifically, the first opposite-side extension electrode 512a, which constitutes one of the (2-1)-th pair, may completely overlap the second one-side extension electrode 322b, which constitutes one of the (1-2)-th pair, and the first opposite-side extension electrode 512b, which constitutes the other of the (2-1)-th pair, may completely overlap the first one-side extension electrode 312a, which constitutes one of the (1-1)-th pair. This overlapping structure is shown in FIG. 25.

Meanwhile, the (2-2)-th pair may partially overlap the (1-2)-th pair and the (1-1)-th pair. Specifically, the second opposite-side extension electrode 522a, which constitutes one of the (2-2)-th pair, may completely overlap the first one-side extension electrode 312b, which constitutes the other of the (1-1)-th pair, and the first opposite-side extension electrode 522b, which constitutes the other of the (2-2)-th pair, may completely overlap the second opposite-side extension electrode 322a, which constitutes the other of the (1-2)-th pair.

Consequently, each extension electrode completely overlaps a corresponding extension electrode, but each pair of extension electrodes partially overlaps a corresponding pair of extension electrodes.

The fourth embodiment, in which each extension electrode completely overlaps a corresponding extension electrode such that each extension electrode completely corresponds to a corresponding extension electrode, may have the following advantages as compared with the first embodiment, in which each extension electrode partially overlaps a corresponding extension electrode such that each extension electrode partially corresponds to a corresponding extension electrode.

First, each extension electrode may be configured using an ITO pattern. In a case in which a pair of extension electrodes is constituted by two extension electrodes as in the fourth embodiment, clearer barrier patterns may be formed within the same potential difference than in a case in which a pair of extension electrodes is constituted by a single extension electrode as in the first embodiment.

Specifically, it is assumed in both the first embodiment and the fourth embodiment that driving signals having the same electric power (P=I*V) are applied to liquid crystals having limited mass and volume in the space inside the LCD, which is limited, in order to drive the electrodes between the upper and lower ITO plates within the same area. In a case in which a pair of electrodes is constituted by two extension electrodes as in the fourth embodiment, no barrier patterns are formed at a slit region, which is interposed between the two divided extension electrodes, but the liquid crystals gather at the electrode regions. As a result, barrier patterns are formed at the electrode regions. In the fourth embodiment, therefore, the barrier patterns at the electrode regions, excluding the slit region, have high clarity due to the physical properties of the liquid crystals based on conservation of mass.

This is because the liquid crystals are more intensively driven according to the driving signals between the ITO patterns than in a case in which a pair of extension electrodes is constituted by a single extension electrode as in the first embodiment. In the fourth embodiment, therefore, it is possible to form clearer barrier patterns while maintaining the same potential difference.

In the parallax barrier system, the clarity of the barrier patterns is critical in improving the stereoscopic performance of the autostereoscopic 3D display. Consequently, the fourth embodiment provides an efficient pattern structure that is capable of improving stereoscopic performance.

The change in arrangement of the barrier patterns caused according to the change in direction of user's gaze and selective application of voltage in this embodiment will be described with reference to FIGS. 26 to 29.

FIG. 26(a) is a view showing a state in which black barrier patterns appear at a first step operation (STEP 1) of the parallax barrier. Low potential voltage is applied to the first extension electrodes 512, and high potential voltage is applied to the other extension electrodes 312, 322, and 522. As a result, barrier patterns are formed between the first one-side electrodes 312 and the first opposite-side electrodes 512, and barrier patterns are formed between the second one-side electrodes 322 and the first opposite-side electrodes 512.

More specifically, a barrier pattern is formed between a left part 312a of two first one-side extension electrodes 312, which form a pair, and a right part 512b of two first opposite-side extension electrodes 512, which form a pair. In addition, a barrier pattern is formed between a right part 322b of two second one-side extension electrodes 322, which form a pair, and a left part 512a of the two first opposite-side extension electrodes 512, which form a pair. Meanwhile, no barrier patterns are formed between two second opposite-side extension electrodes 522, which form a pair, and a left part 512a of the two first opposite-side extension electrodes 512, which form a pair, and a left part 322a of the two second one-side extension electrodes 322, which form a pair. The portions at which no barrier patterns are formed may function as slits, through which light is transmitted.

FIG. 26(b) shows a state in which voltage signals are applied to the respective extension electrodes using tables and graphs. 'H' indicates high potential voltage, and 'L' indicates low potential voltage. In a case in which low potential voltage is applied to the first opposite-side extension electrodes 512 via the first opposite-side terminal C1, and high potential voltage is applied to the other extension electrodes 312, 322, and 522, as described above, the same barrier patterns as shown in FIG. 26(a) may be formed.

On the other hand, in a case in which high potential voltage is applied to the first opposite-side extension electrodes 512, and low potential voltage is applied to the other extension electrodes 312, 322, and 522, the same barrier patterns as shown in FIG. 26(a) may be formed.

When second to fourth step operations are performed after the first step operation of the parallax barrier as described above, the barrier patterns may be sequentially shifted in a specific direction by one column. One column does not correspond to a pair of extension electrodes but corresponds to one constituting the pair of extension electrodes.

The change in state to the second to fourth step may be achieved based on the change in position of the barrier patterns performed according to the same principle as was described above.

The barrier patterns formed at the second step are shown in FIG. 27(a), and the conditions in which the electrodes are driven are shown in FIG. 27(b). The barrier patterns formed at the third step are shown in FIG. 28(a), and the conditions in which the electrodes are driven are shown in FIG. 28(b). The barrier patterns formed at the fourth step are shown in FIG. 29(a), and the conditions in which the electrodes are driven are shown in FIG. 29(b).

A further description of the second to fourth steps will be omitted since the mechanism and structures at the second to fourth steps are similar to those at the first step.

Relationship Between First to Fourth Embodiments, Combination, and Modifications The first to fourth embodiments, which are exemplary embodiments of the present invention, may be combined.

The first and second embodiments have a common point in that one extension electrode of the one-side electrode or the opposite-side electrode partially overlap another extension electrode of the one-side electrode or the opposite-side electrode. In addition, the third and fourth embodiments have a common point in that the extension electrodes of the one-side electrode and the opposite-side electrode completely overlap each other. The embodiments may be various combined based on the common point in order to constitute a stereoscopic image display apparatus having changeable barrier patterns.

In the above description of the embodiments, two or more electrodes of the one-side electrode (the opposite-side electrode) are engaged with each other in a vertical direction. Alternatively, the two or more electrodes may be alternately arranged in the same direction, not in the vertical direction.

Meanwhile, in the first and second embodiments, the extension electrodes of each electrode are arranged in the vertical direction. In a modification (first modification) thereof, however, the extension electrodes may be arranged in an inclined direction (an oblique direction), rather than in the vertical direction. In a case in which the extension electrodes may be arranged in the inclined direction as described above, it is possible to prevent the occurrence of a color distortion phenomenon.

The color distortion phenomenon will be described as follows.

When the extension electrodes of the one-side electrode and the opposite-side electrode are arranged in the same direction as a longitudinal direction of R, G, and B sub-pixels of the image panel, only images corresponding to sub-pixels having different colors are introduced into the right eye and the left eye when viewed from the front. In this case, when the left eye image and the right eye image are combined in order to perceive a 3D image, a color distortion phenomenon, in which only an image having a specific color is perceived, may occur.

In order to prevent the occurrence of the color distortion phenomenon, the parallax barrier according to this modification is configured such that the extension electrodes are not arranged in a direction parallel to a vertical direction of the sub-pixels, but are arranged in a direction inclined by a specific angle with respect to the vertical direction of the sub-pixels. In this case, images corresponding to sub-pixels having different colors are introduced into the left eye and the right eye such that the colors are mixed, thereby preventing the occurrence of the color distortion phenomenon.

Figure 30:
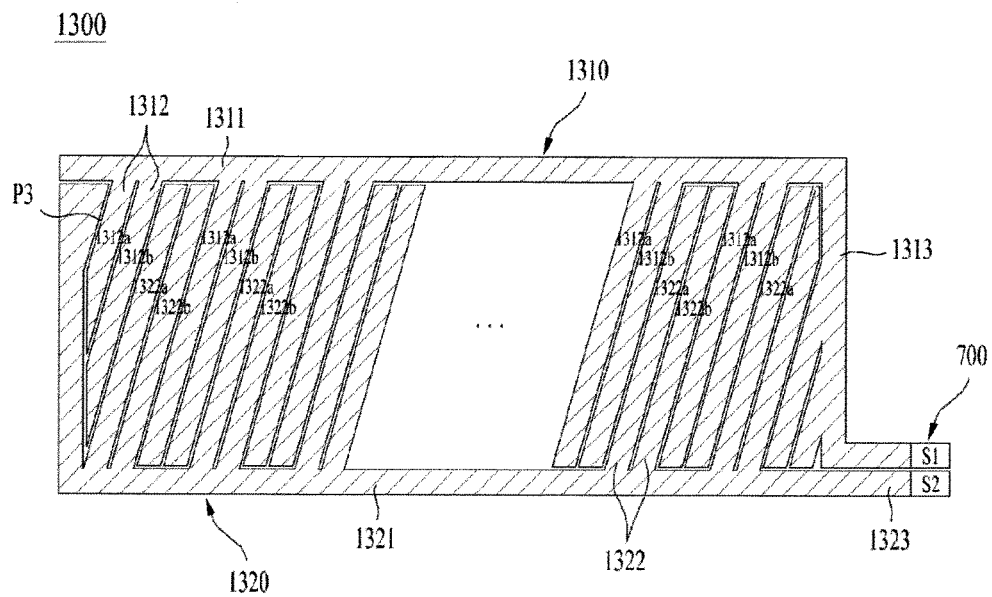
FIGS. 30 to 32 are views illustrating a structure in which electrodes extend in an oblique direction according to a modification of the present invention.
Figure 31:
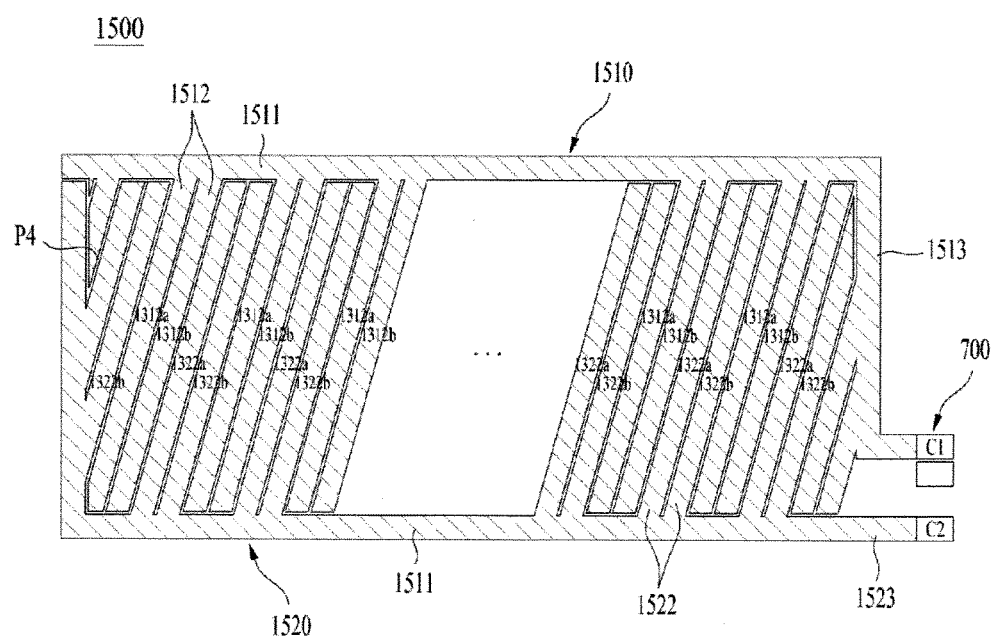
Figure 32:
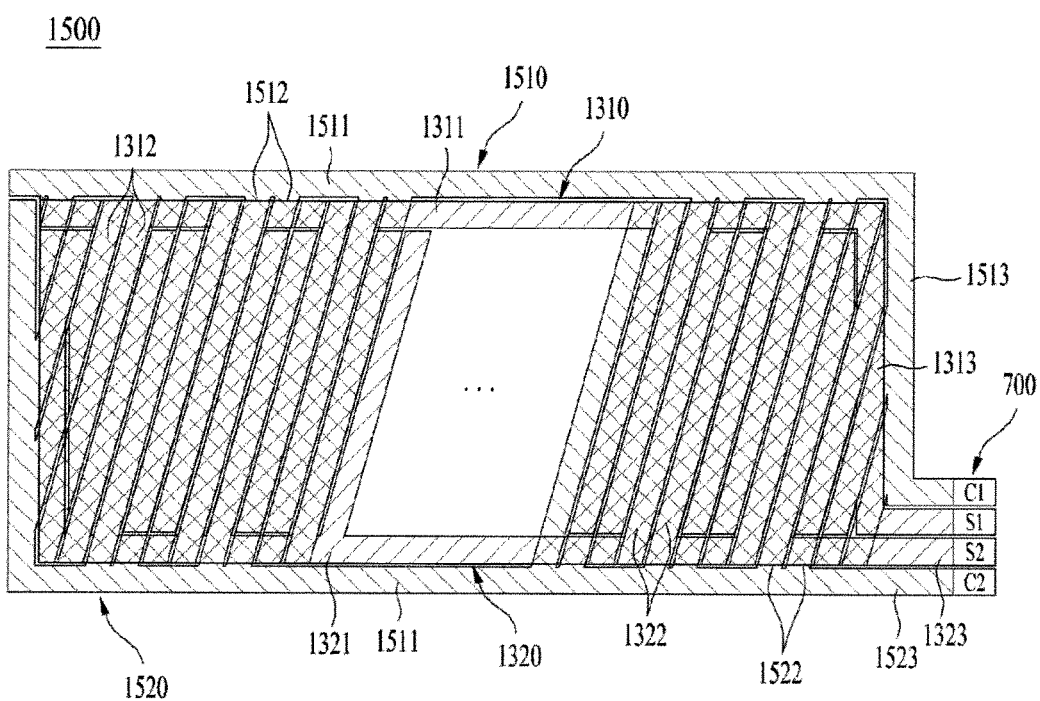

FIGS. 30 to 32 are views showing an example in which the electrodes extending in the oblique direction according to this modification are applied to the fourth embodiment.

Specifically, FIG. 30 shows a one-side electrode 1310, FIG. 31 shows an opposite-side electrode 1510, and FIG. 32 shows an example in which the one-side electrode 1310 and the opposite-side electrode 1510 are stacked in a state in which a liquid crystal layer is disposed therebetween. This embodiment is identical to the fourth embodiment except that the extension electrodes are arranged in the oblique direction as described above.

In addition, the structure of the extension electrodes may be equally applied to the first to third embodiments described above.

Meanwhile, the first to fourth embodiments have been described on the assumption that the barrier patterns can be changed through the four steps. Alternatively, the number of steps may be changed in the respective embodiments.

Figure 33:
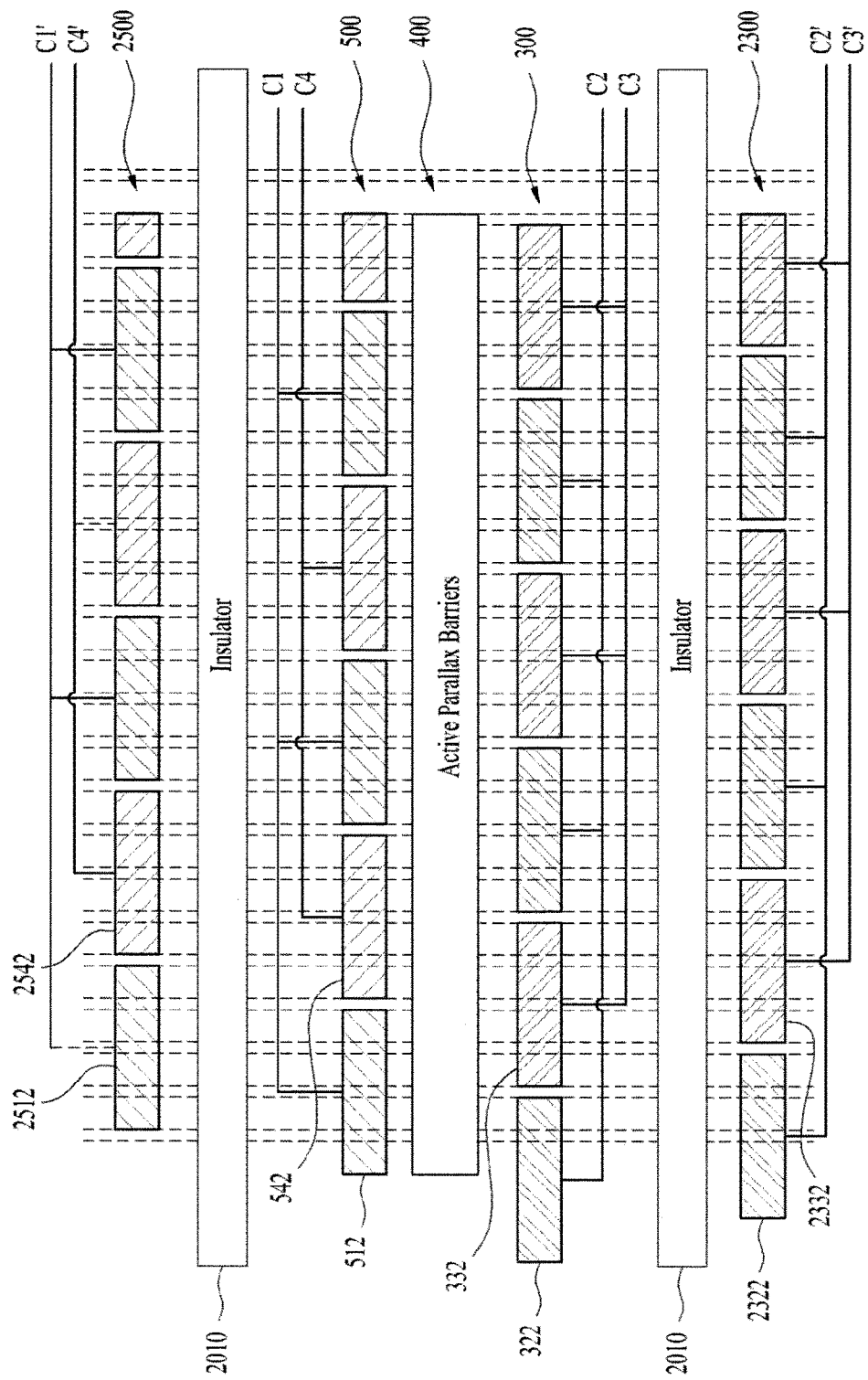
FIG. 33 is a view illustrating a structure for increasing the number of barrier patterns that are changed according to another modification of the present invention.

FIG. 33 is a view illustrating a structure for increasing the number of barrier patterns that are changed in the first embodiment of the present invention.

Referring to FIG. 33, an additional one-side electrode 2300 and an additional opposite-side electrode 2300 are further provided in order to increase the number of barrier patterns through the four steps based on the one-side electrode 300 and the opposite-side electrode 500 in the first embodiment described above. An insulation material 2010 may be used in order to further provide the additional one-side electrode and the additional opposite-side electrode. Meanwhile, two terminals C2' and C3' may be further provided in order to drive the additional one-side electrode 2300, and two terminals C1' and C4' may be further provided in order to drive the additional opposite-side electrode 2500.

In the example of FIG. 33, a single one-side electrode and a single opposite-side electrode may be further provided, as described above, in order to change the barrier patterns through eight steps. The barrier patterns may be changed in a manner similar to the first embodiment.

The addition of the barrier pattern changing steps using the additional one-side electrode and the additional opposite-side electrode, as shown in FIG. 33, may be equally applied to the second to fourth embodiments. However, in the respective embodiments, the barrier pattern changing steps may be added using unique methods based on the structural characteristics of the respective embodiments.

For example, in the second embodiment, it is possible to easily increase the number of barrier pattern changing steps by increasing the number of extension electrodes of the one-side electrode (the opposite-side electrode) corresponding to the extension electrodes of the opposite-side electrode (the one-side electrode). For example, in a case in which the number of extension electrodes of the one-side electrode (the opposite-side electrode) corresponding to the extension electrodes of the opposite-side electrode (the one-side electrode) is three, it is possible to provide six barrier pattern changing steps.

In addition, in the third embodiment, it is possible to easily increase the number of barrier pattern changing steps by increasing the number of extension electrodes of the one-side electrode and the opposite-side electrode to which different potentials are applied. For example, in a case in which the number of extension electrodes of the one-side electrode and the opposite-side electrode to which different potentials are applied is eight rather than four, it is possible to provide eight barrier pattern changing steps.

Meanwhile, in the first to fourth embodiments described above, the barrier patterns are formed only in the vertical direction or the horizontal direction, and thus only the position of the barrier patterns are changed based on the position of the eyes or head of a viewer. In the respective embodiments, however, the additional one-side electrode and the additional opposite-side electrode may be arranged perpendicular to the existing one-side electrode and the existing opposite-side electrode in order to configure cell type barrier patterns such that the barrier patterns can be changed horizontally or vertically.

Figure 34:
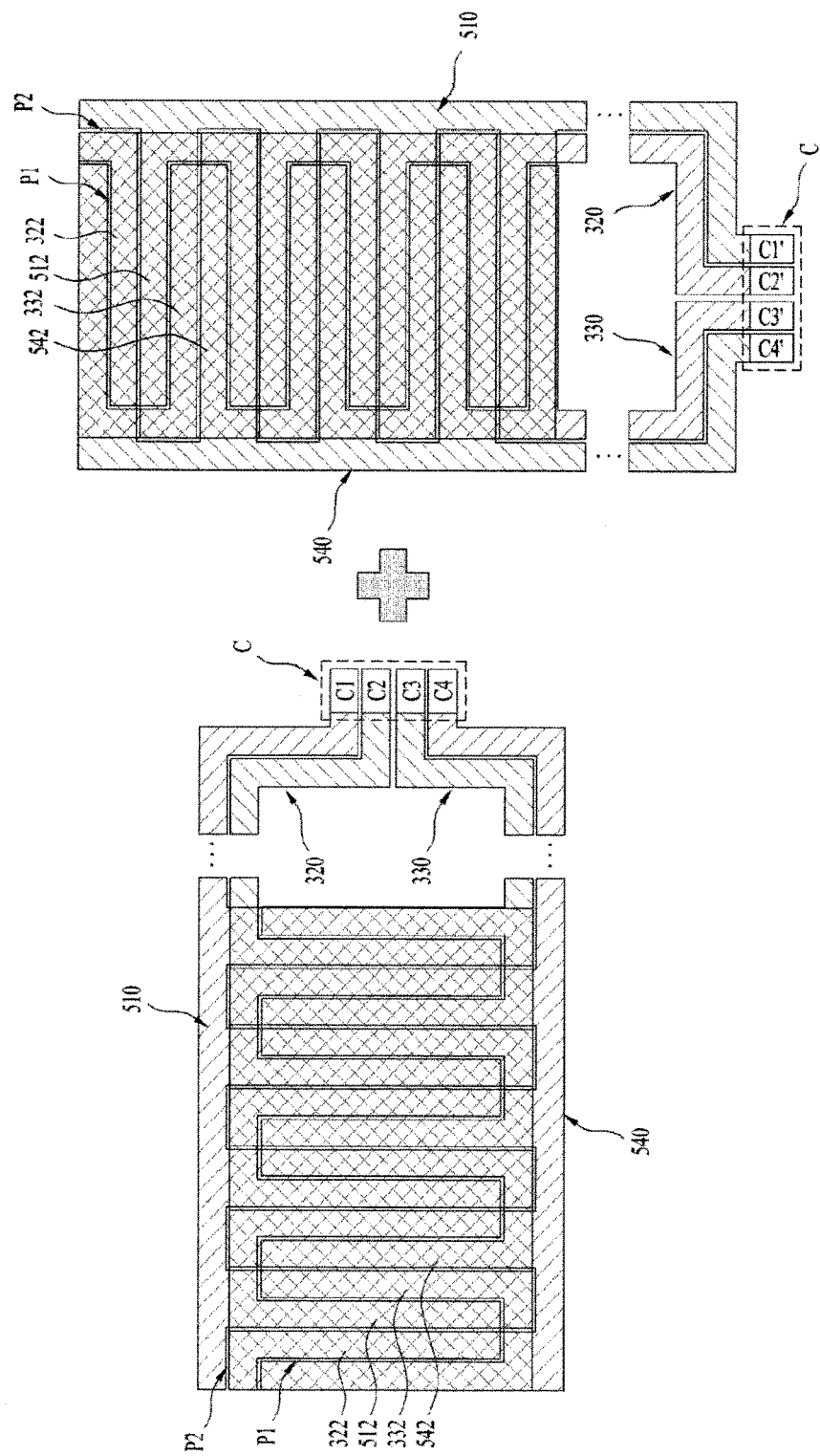
FIGS. 34 to 37 are views illustrating a structure for forming horizontal or vertical barrier patterns according to a further modification of the present invention.

FIG. 34 is a view illustrating a structure for changing barrier patterns horizontally and vertically according to a further modification of the present invention.

The left part of FIG. 34 shows a structure in which the one-side terminal (the first one-side terminal) and the opposite-side terminal (the first opposite-side terminal) according to the first embodiment of the present invention are stacked, and four terminals C1 to C4 are connected in order to drive the one-side terminal and the opposite-side terminal. Meanwhile, this modification (the second modification) proposes embodying barrier patterns that can be changed in the horizontal direction or in the vertical direction through the further use of patterns obtained by rotating the terminal patterns shown in the left part of the FIG. 34 by 90 degrees, as shown in the right part of FIG. 34. That is, a combination of the two types of patterns shown in FIG. 34 is shown in FIG. 35.

Figure 35:
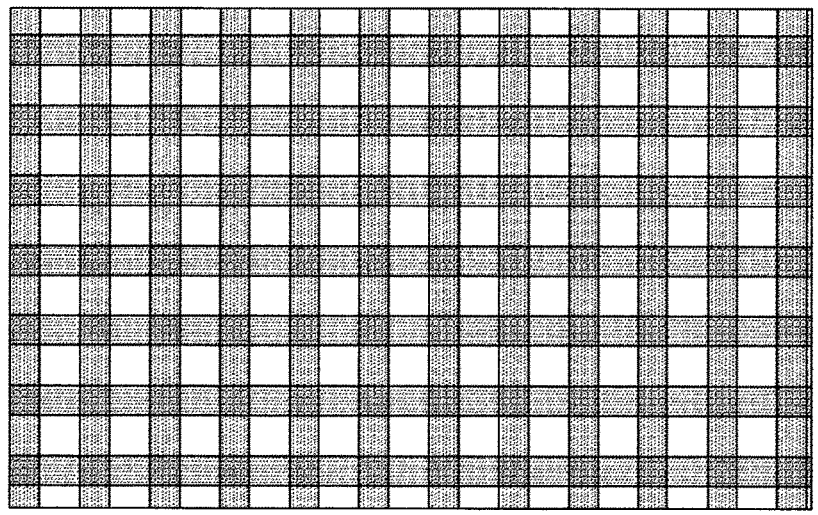
Figure 36:
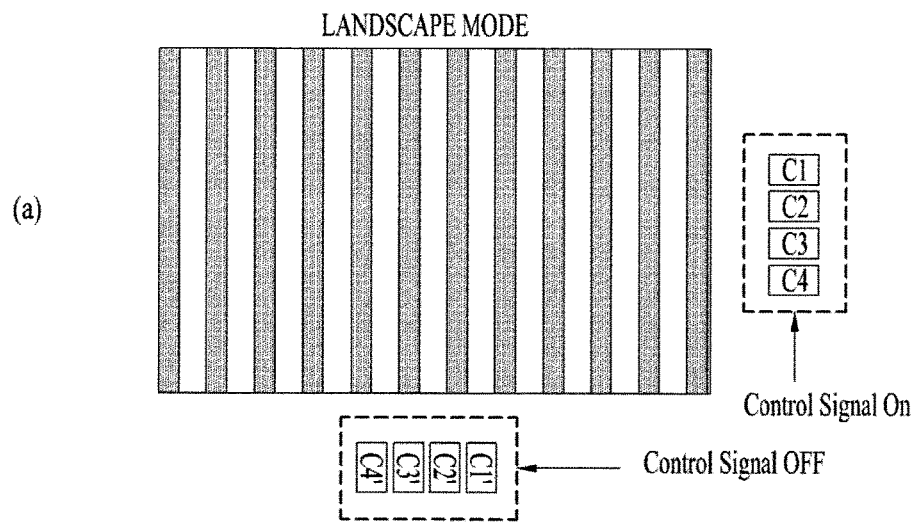
Figure 37:
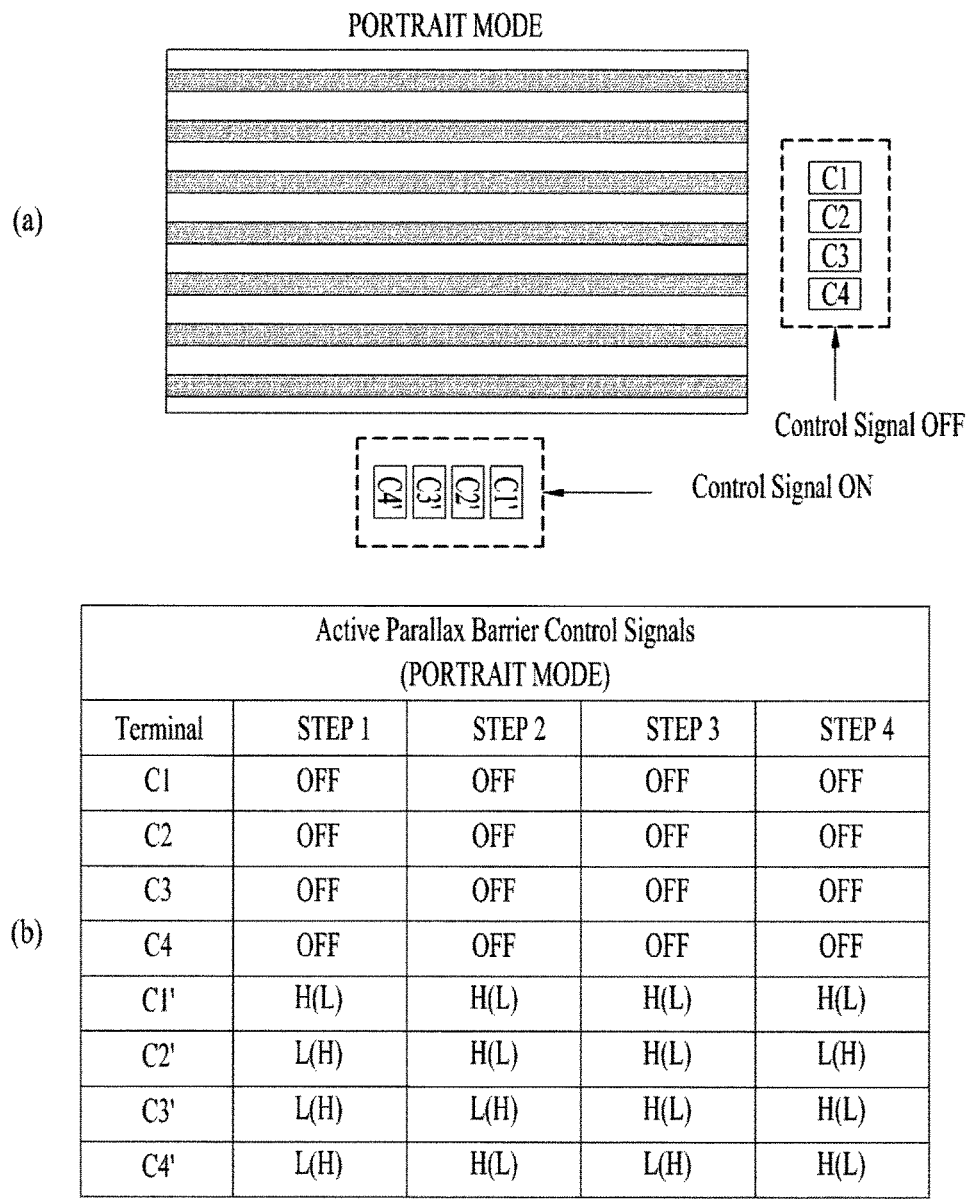

FIGS. 36 and 37 are views illustrating a driving principle for embodying horizontal/vertical barrier patterns using the structures of FIGS. 34 and 35.

First, in order to embody vertical barrier patterns, i.e. a landscape mode, driving pulses may be applied only to the four existing terminals C1 to C4 according to the same principle as in the first embodiment, and the additional four terminals C1' to C4' may be turned OFF. On the other hand, in order to embody horizontal barrier patterns, i.e. a portrait mode, the four existing terminals C1 to C4 may be turned OFF, and driving pulses may be applied only to the additional four terminals C1' to C4' according to the same principle as in the first embodiment.

Meanwhile, the configuration of the landscape/portrait mode as described above may be equally applied to the second to fourth embodiments.

For example, in a case in which the above method is applied to the second embodiment, the stereoscopic image display apparatus may include a first electrode module disposed at the circumference of a liquid crystal unit in a first direction, the first electrode module including a first one-side electrode and a first opposite-side electrode that face each other while the liquid crystal unit is interposed between the first one-side electrode and the first opposite-side electrode, and a second electrode module disposed at the circumference of the first electrode module in a second direction perpendicular to the first direction, the second electrode module including a second one-side electrode and a second opposite-side electrode that face each other while the first electrode module and the liquid crystal unit are interposed between the second one-side electrode and the second opposite-side electrode.

The stereoscopic image display apparatus may further include an insulator interposed between the first and second one-side electrodes and between the first and second opposite-side electrodes for preventing the flow of electric current between the respective electrodes. In addition, the stereoscopic image display apparatus may further include a terminal unit for individually applying voltages or pulses to the respective one-side electrodes and the respective opposite-side electrodes. Extension electrodes of each of the one-side electrodes may overlap extension electrodes of each of the opposite-side electrodes. Each of the extension electrodes of each of the opposite-side electrodes corresponding to a corresponding one of the extension electrodes of each of the one-side electrodes may be divided into a plurality of parts, which forms a set. A state in which barrier patterns formed in the liquid crystal unit are arranged can be changed based on voltages or pulses applied to the respective one-side electrodes and the respective opposite-side electrodes.

In this structure, a direction in which barrier patterns formed when voltages or pulses are applied to the first electrode module are arranged may be perpendicular to a direction in which barrier patterns formed when voltages or pulses are applied to the second electrode module are arranged.

Meanwhile, in a case in which the above method is applied to the third embodiment or the fourth embodiment, the stereoscopic image display apparatus may include an upper electrode module including an upper one-side electrode having one or more upper one-side extension electrodes, which are spaced apart from each other, and an upper opposite-side electrode having one or more upper opposite-side extension electrodes, which are spaced apart from each other, a lower electrode module including a lower one-side electrode having one or more lower one-side extension electrodes, which are spaced apart from each other, and an lower opposite-side electrode having one or more lower opposite-side extension electrodes, which are spaced apart from each other, the lower electrode module being disposed in a direction perpendicular to a direction in which the upper electrode module is disposed, a liquid crystal unit interposed between the respective one-side electrodes and the respective opposite-side electrodes for forming barrier patterns based on an electric field or potential difference that is selectively formed therebetween, and an insulator interposed between the upper electrode module and the lower electrode module for preventing electric conduction between the upper electrode module and the lower electrode module, wherein the upper or lower one-side extension electrodes overlap the upper or lower opposite-side extension electrodes one by one, and a state in which barrier patterns formed in the liquid crystal unit are arranged can be changed based on voltages or pulses applied to the respective one-side electrodes and the respective opposite-side electrodes.

Specifically, in the third embodiment, each of the one-side or opposite-side extension electrodes may be electrically conductively connected to an opposite-side extension electrode or a one-side extension electrode neighboring a corresponding one of the opposite-side or one-side extension electrodes overlapping each of the one-side or opposite-side extension electrodes such that the same voltage or pulse can be applied thereto. In addition, in the fourth embodiment, each of the upper or lower one-side extension electrodes and a neighboring one of the upper or lower opposite-side extension electrodes may form a pair such that the same voltage or pulse can be applied thereto.

In this structure, a direction in which barrier patterns formed when voltages or pulses are applied to the upper electrode module are arranged may be perpendicular to a direction in which barrier patterns formed when voltages or pulses are applied to the lower electrode module are arranged.

Those skilled in the art will appreciate that the present invention may be carried out in other specific ways than those set forth herein without departing from the spirit and essential characteristics of the present invention.

The above embodiments are therefore to be construed in all aspects as illustrative and not restrictive.

The scope of the invention should be determined by the appended claims and their legal equivalents, not by the above description, and all changes coming within the meaning and equivalency range of the appended claims are intended to be embraced therein.

INDUSTRIAL APPLICABILITY

As is apparent from the above description, it is possible to enable a user to view a high-quality 3D image irrespective of the user's movement through the use of a stereoscopic image display apparatus that is capable of forming barrier patterns that can be changed based on the position of the user.

The invention claimed is:

1. A stereoscopic image display apparatus comprising:
a one-side electrode comprising a plurality of extension electrodes spaced apart from each other;
an opposite-side electrode comprising a plurality of extension electrodes spaced apart from each other;
a liquid crystal unit interposed between the one-side electrode and the opposite-side electrode for selectively forming any one of a plurality of barrier patterns based on an electric field or potential difference selectively formed therebetween,
wherein one of the extension electrodes of the one-side electrode overlaps at least two of the extension electrodes of the opposite-side electrode, and
a first terminal for applying electrical pulses to the one-side electrode and a second terminal for applying electrical pulses to the opposite-side electrode,
wherein a state in which the barrier patterns formed in the liquid crystal unit are arranged is changed based on the pulses being applied to the one-side electrode and the opposite-side electrode.

2. The stereoscopic image display apparatus according to claim 1, wherein the one-side electrode comprises first one-side extension electrodes and second one-side extension electrodes alternately arranged,
wherein the opposite-side electrode comprises first opposite-side extension electrodes and second opposite-side extension electrodes alternately arranged,
wherein one of the first one-side extension electrodes overlaps a first pair formed by one of the first opposite-side extension electrodes and one of the second opposite-side extension electrodes, and
wherein one of the second one-side extension electrodes overlaps a second pair formed by one of the first opposite-side extension electrodes and one of the second opposite-side extension electrodes.

3. The stereoscopic image display apparatus according to claim 2, wherein the stereoscopic image display apparatus is configured to change electric potential applied to the first opposite-side extension electrodes and the second opposite-side extension electrodes by reflecting a change in position of eyes or a head of a user captured using a predetermined detection means in a state in which different electric potentials are applied to the first one-side extension electrodes and the second one-side extension electrodes.

4. The stereoscopic image display apparatus according to claim 1, wherein the one-side extension electrodes comprise a first one-side extension electrode and a second one-side extension electrode, and
wherein a set of opposite-side extension electrodes corresponding to one of the extension electrodes of the one-side electrode comprises a first opposite-side extension electrode and a second opposite-side extension electrode.

5. The stereoscopic image display apparatus according to claim 4, wherein the barrier patterns are arranged such that the barrier patterns are changed based on a change in position of a user's gaze, and a state of arrangement of the barrier patterns is changed at a plurality of steps in response to the position of the user's gaze, the steps comprising:
a first step, at which a potential difference is generated between the first one-side extension electrode and the first and second opposite-side extension electrodes to form barrier patterns;
a second step, at which a potential difference is generated between the first one-side extension electrode and the second opposite-side extension electrode and between the second one-side extension electrode and the first opposite-side extension electrode to form barrier patterns;
a third step, at which a potential difference is generated between the second one-side extension electrode and the first and second opposite-side extension electrodes to form barrier patterns; and
a fourth step, at which a potential difference is generated between the first one-side extension electrode and the first opposite-side extension electrode and between the second one-side extension electrode and the second opposite-side extension electrode to form barrier patterns.

6. The stereoscopic image display apparatus according to claim 5, wherein the first to fourth steps are performed in reverse.

7. The stereoscopic image display apparatus according to claim 1, wherein
the one-side extension electrodes comprise a first one-side extension electrode and a second one-side extension electrode, and a set of opposite-side extension electrodes corresponding to one of the extension electrodes of the one-side electrode comprises a first opposite-side extension electrode, a second opposite-side extension electrode, and a third opposite-side extension electrode.

8. The stereoscopic image display apparatus according to claim 7, wherein the barrier patterns are arranged such that the barrier patterns are changed based on a change in position of a user's gaze, and a state of arrangement of the barrier patterns is changed at a plurality of steps in response to the position of the user's gaze, the steps comprising:
 a first step, at which a potential difference is generated between the first one-side extension electrode and the first, second, and third opposite-side extension electrodes to form barrier patterns;
 a second step, at which a potential difference is generated between the first one-side extension electrode and the second and third opposite-side extension electrode and between the second one-side extension electrode and the first opposite-side extension electrode to form barrier patterns;
 a third step, at which a potential difference is generated between the one one-side extension electrode and the third opposite-side extension electrode and between the second one-side extension electrode and the first and second opposite-side extension electrodes to form barrier patterns;
 a fourth step, at which a potential difference is generated between the second one-side extension electrode and the first, second, and third opposite-side extension electrodes to form barrier patterns;
 a fifth step, at which a potential difference is generated between the first one-side extension electrode and the first opposite-side extension electrode and between the second one-side extension electrode and the first and second opposite-side extension electrodes to form barrier patterns; and
 a sixth step, at which a potential difference is generated between the first one-side extension electrode and the first and second opposite-side extension electrodes and between the second one-side extension electrode and the third opposite-side extension electrode to form barrier patterns.

9. The stereoscopic image display apparatus according to claim 8, wherein the first to sixth steps are performed in reverse.

10. The stereoscopic image display apparatus according to claim 1, wherein a number of barrier pattern changing steps is equivalent to twice a number of opposite-side extension electrodes corresponding to one of the extension electrodes of the one-side electrode.

11. The stereoscopic image display apparatus according to claim 1, wherein the extension electrodes of the one-side electrode and the opposite-side electrode are inclined by a non-zero predetermined angle with respect to a vertical direction.

12. The stereoscopic image display apparatus according to claim 1, wherein a first barrier pattern of the plurality of barrier patterns is formed while the first terminal applies a first series of pulses to the one-side electrode and the second terminal applies a second series of pulses to the opposite-side electrode, and a second barrier pattern of the plurality of barrier patterns is formed while the first terminal applies a third series of pulses, different from the first series of pulses, to the one-side electrode and the second terminal applies the second series of pulses to the opposite-side electrode.

13. A stereoscopic image display apparatus comprising:
 a one-side electrode comprising a plurality of extension electrodes spaced apart from each other;
 an opposite-side electrode comprising a plurality of extension electrodes spaced apart from each other;
 a liquid crystal unit interposed between the one-side electrode and the opposite-side electrode for selectively forming any one of a plurality of barrier patterns based on an electric field or potential difference selectively formed therebetween,
 wherein one of the extension electrodes of the one-side electrode overlaps at least two of the extension electrodes of the opposite-side electrode;
 a first pair of terminals electrically connected to the one-side electrode; and
 a second pair of terminals electrically connected to the opposite-side electrode,
 wherein the first pair of terminals are adjacent to each other, and interpose the second pair of terminals,
 wherein the first pair of terminals apply electrical pulses to the one-side electrode and the second pair of terminals apply electrical pulses to the opposite-side electrode, and
 wherein the electric field or potential difference is selectively formed between the one-side electrode and the opposite-side electrode by the electrical pulses applied to the one-side electrode and the electrical pulses applied to the opposite-side electrode.

14. The stereoscopic image display apparatus according to claim 13, wherein a state in which the barrier patterns formed in the liquid crystal unit are arranged is changed based on pulses applied to the one-side electrode and the opposite-side electrode.

15. The stereoscopic image display apparatus according to claim 13, wherein a first barrier pattern of the plurality of barrier patterns is formed while the first pair of terminals applies a first pair of pulse signals to the one-side electrode and the second pair of terminals applies a second pair of pulse signals to the opposite-side electrode.

16. The stereoscopic image display apparatus according to claim 15, wherein a second barrier pattern of the plurality of barrier patterns is formed while the first pair of terminals applies a third pair of pulse signals, different from the first pair of pulse signals, to the one-side electrode and the second terminal applies the second series of pulses to the opposite-side electrode.

17. A method of controlling a stereoscopic image display apparatus, the method comprising:
 driving a liquid crystal unit interposed between a one-side electrode and an opposite-side electrode to selectively form any one of a plurality of different barrier patterns in response to a corresponding electric field or potential difference applied thereto by the one-side electrode and the opposite-side electrode, the driving comprising:
 applying a one-side driving signal to the one-side electrode, the one-side driving signal being the same for each of the plurality of different barrier patterns; and
 applying a selected one of a plurality of different opposite-side driving signals to the opposite-side electrode, each of the plurality of different opposite-side driving signals corresponding to a respective one of the plurality of different barrier patterns;
 wherein the electric field or potential difference is formed between at least one extension electrode of the one-side electrode and at least two extension electrodes of the opposite-side electrode in response to the applying of the one-side driving signal and the selected one of the plurality of different opposite-side driving signals.

18. The method of claim 17, wherein the applying of the one-side driving signal to the one-side electrode includes applying a first series of one-side pulses to a first one-side terminal of the one-side electrode, and wherein the applying of the selected one of the plurality of different opposite-side driving signals to the opposite-side electrode includes applying a first series of opposite-side pulses to a first opposite-side terminal of the opposite-side electrode.

19. The method of claim 18, wherein the applying of the one-side driving signal to the one-side electrode includes applying a second series of one-side pulses to a second one-side terminal of the one-side electrode, and wherein the applying of the selected one of the plurality of different opposite-side driving signals to the opposite-side electrode includes applying a second series of opposite-side pulses to a second opposite-side terminal of the opposite-side electrode.

20. The method of claim 17, further comprising switching from a landscape display mode to a portrait display mode, the switching comprising:
- stopping the applying of the one-side driving signal to the one-side electrode;
- stopping the applying of the selected one of the plurality of different opposite-side driving signals to the opposite-side electrode;
- applying a portrait-mode one-side driving signal to a portrait-mode one-side electrode; and
- applying a selected one of a plurality of different portrait-mode opposite-side driving signals to a portrait-mode opposite-side electrode.

* * * * *